US010263667B2

(12) United States Patent
Zakaria et al.

(10) Patent No.: US 10,263,667 B2
(45) Date of Patent: Apr. 16, 2019

(54) MESH NETWORK DEVICE WITH POWER LINE COMMUNICATIONS (PLC) AND WIRELESS CONNECTIONS

(71) Applicant: AMAZON TECHNOLOGIES, INC., Seattle, WA (US)

(72) Inventors: Omar Fawazhashim Zakaria, Santa Clara, CA (US); Cheol Su Kim, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 15/228,595

(22) Filed: Aug. 4, 2016

(65) Prior Publication Data

US 2018/0041247 A1   Feb. 8, 2018

(51) Int. Cl.
*H04B 3/54*   (2006.01)
*H04W 40/12*   (2009.01)
*H04W 84/18*   (2009.01)

(52) U.S. Cl.
CPC .......... *H04B 3/542* (2013.01); *H04W 40/12* (2013.01); *H04W 84/18* (2013.01)

(58) Field of Classification Search
CPC .................................................... H04B 3/542
See application file for complete search history.

(56) References Cited

U.S. PATENT DOCUMENTS

| 8,488,627 | B2 * | 7/2013 | Hunter | H04L 45/74 |
| | | | | 370/469 |
| 8,570,999 | B1 * | 10/2013 | Nguyen | H04B 3/542 |
| | | | | 370/343 |
| 9,518,838 | B2 * | 12/2016 | Yamamoto | H04Q 9/00 |
| 2003/0129978 | A1 * | 7/2003 | Akiyama | H04B 3/54 |
| | | | | 455/426.1 |
| 2007/0288663 | A1 * | 12/2007 | Shear | H04L 12/66 |
| | | | | 709/249 |

(Continued)

FOREIGN PATENT DOCUMENTS

| EP | 2 699 40 | A1 | 2/2014 | |
| EP | 2699040 | A1 * | 2/2014 | ............... H04B 3/46 |

OTHER PUBLICATIONS

International Search Report and Written Opinion dated Oct. 31, 2017, on application No. PCT/US2017/044613.

*Primary Examiner* — Parth Patel
(74) *Attorney, Agent, or Firm* — Lowenstein Sandler LLP

(57) ABSTRACT

Network hardware devices organized in a wireless mesh network (WMN) in which one network hardware devices includes a first wireless radio and a power line communications (PLC) radio coupled to a processing device. The processing device communicates, using the first wireless radio, first data with a second mesh network device over a wireless link between the first wireless radio and a first wireless radio of the second mesh network device. The processing device also communicates, via the power distribution network via the PLC radio, second data with the second mesh network device over a PLC link between the first PLC radio and a first PLC radio of the second mesh network device. The first data and the second data may be redundant data. The first data may be content data and second data may be control data. The first and second data may be subsets of the same digital content.

20 Claims, 10 Drawing Sheets

(56) References Cited

U.S. PATENT DOCUMENTS

| | | | | |
|---|---|---|---|---|
| 2008/0259888 A1* | 10/2008 | Terashima | ............... | H04B 3/54 370/338 |
| 2012/0147746 A1* | 6/2012 | Shaffer | ................ | H04L 47/122 370/235 |
| 2012/0147783 A1* | 6/2012 | Shaffer | ................ | H04W 4/023 370/254 |
| 2012/0177057 A1* | 7/2012 | Hemli | .................... | H04L 47/14 370/406 |
| 2012/0218120 A1* | 8/2012 | Ree | ......................... | H04Q 9/00 340/870.02 |
| 2012/0229295 A1* | 9/2012 | Sharma | ................. | G01D 4/002 340/870.02 |
| 2012/0268291 A1* | 10/2012 | Boot | ......................... | H04L 1/22 340/870.03 |
| 2012/0315899 A1* | 12/2012 | Shapira | ................ | H04W 36/30 455/432.1 |
| 2013/0028247 A1* | 1/2013 | Li | .......................... | H04L 45/24 370/338 |
| 2013/0107792 A1* | 5/2013 | Lam | ..................... | H04W 84/18 370/315 |
| 2013/0132604 A1* | 5/2013 | Cohen | ................... | H04W 76/15 709/231 |
| 2014/0009063 A1* | 1/2014 | Cregg | ................ | H05B 37/0272 315/34 |
| 2014/0036702 A1* | 2/2014 | Van Wyk | ................ | H04B 3/46 370/252 |
| 2014/0170979 A1* | 6/2014 | Samanta Singhar | ... | G10L 25/60 455/41.2 |
| 2015/0043661 A1* | 2/2015 | Okada | .................... | H04B 3/542 375/257 |
| 2015/0049616 A1* | 2/2015 | Ho | ........................ | H04W 24/02 370/252 |
| 2015/0110159 A1* | 4/2015 | Hui | ..................... | H04B 1/7143 375/133 |
| 2015/0341140 A1* | 11/2015 | Hui | ...................... | H04L 1/0015 370/254 |
| 2016/0118793 A1* | 4/2016 | Davis | .................... | H04L 12/282 700/295 |
| 2016/0154040 A1* | 6/2016 | Driscoll | ................ | G01R 25/00 324/76.77 |
| 2016/0286633 A1* | 9/2016 | Juslen | ................ | H05B 33/0815 |
| 2016/0301582 A1* | 10/2016 | Arndt | ..................... | H04L 43/04 |

* cited by examiner

MESH NETWORK DEVICE WITH POWER LINE COMMUNICATIONS (PLC) AND WIRELESS CONNECTIONS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
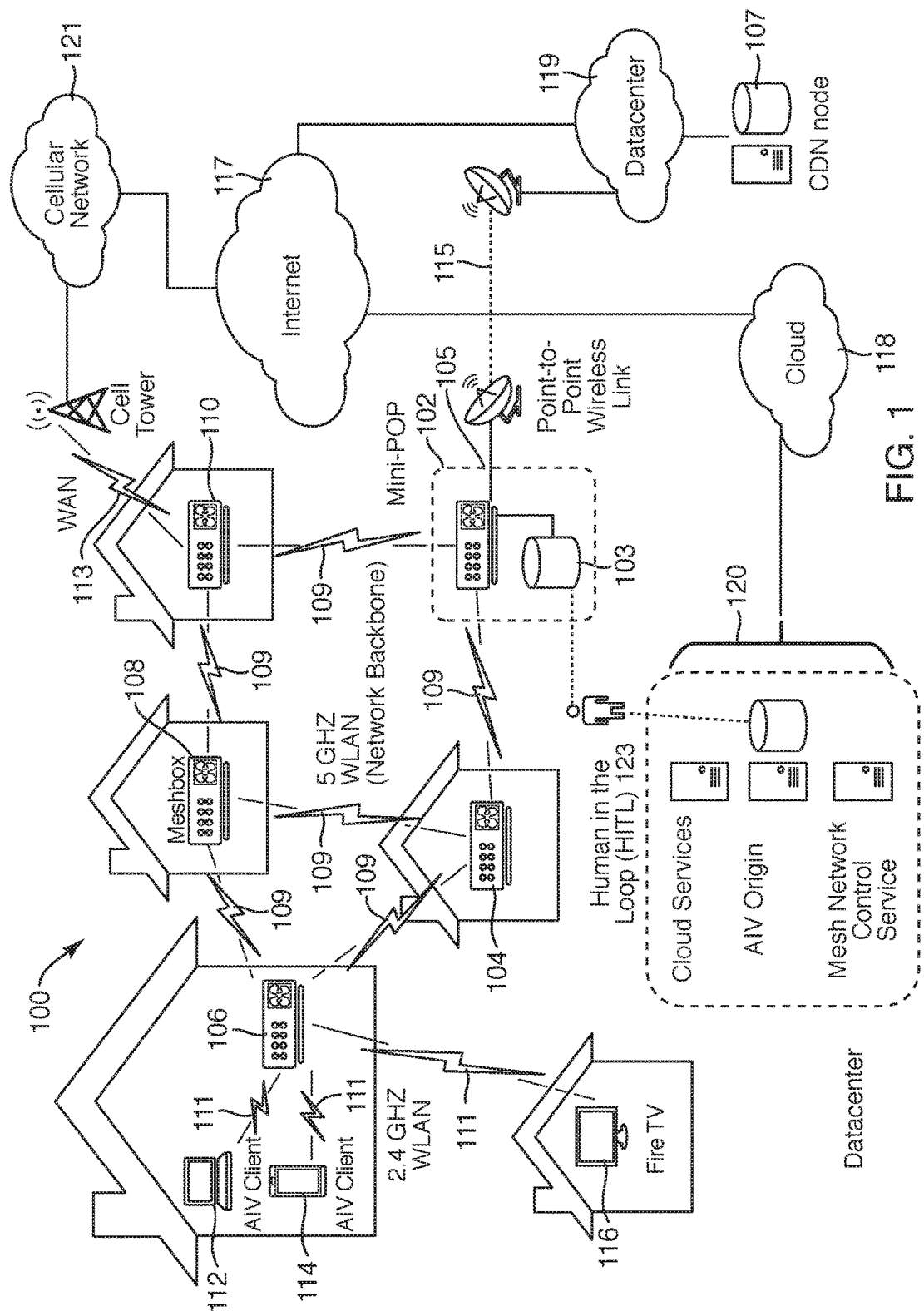
FIG. 1 is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The cellular connections may have lower bandwidths than the point-to-point wireless link. A second network hardware device is wirelessly connected to the first network hardware device over a first P2P connection. During operation, the second network hardware device is wirelessly connected to a first client consumption device over a first N2C connection. The second network hardware device receives a first request for a first content file from the first client consumption device over the first N2C connection. The second hardware device sends a second request for the first content file to the first network hardware device over the first P2P connection. The second hardware device receives the first content file from the first network hardware device over the first P2P connection and sends the first content file to the first client consumption device over the first N2C connection. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multimedia content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

Also described herein are embodiments of a mesh network device with power line communication (PLC) capabilities for redundancy, for a separate command and control plane, for aggregation, as described herein. In one embodiment, a WMN includes 1) a mini-POP device; 2) a first mesh network device; and 3) a second mesh network device. The mini-POP device has at least one of a first wired connection to an attached storage device and a point-to-point wireless connection to a server of a CDN. The first mesh network device has a) a first application processor; b) a first alternating current (AC) power line coupled to a power distribution network, the first AC power line supplying power to the first mesh network device; c) a first wireless local area network (WLAN) radio coupled to the first application processor, the first WLAN radio to wirelessly communicate with the mini-POP device; d) a second WLAN radio coupled to the first application processor; and e) a first power line communications (PLC) radio coupled to the first AC power line and the first application processor. The second mesh network device has a) a second application processor; b) a second AC power line coupled to the power distribution network, where the second AC power line supplies power to the second mesh network device; c) a third WLAN radio coupled to the second application processor; and d) a second PLC radio coupled to the second application processor. The first application processor is operable to transmit first data packets to the second mesh network device over a wireless link between the first WLAN radio and the third WLAN radio of the second mesh network device; and transmit second data packets to the second mesh network device over a PLC link between the first PLC radio and the second PLC radio of the second mesh network device via the power distribution network.

As described herein, the PLC link can be used for redundant transmissions. For example, the first data packets can include digital content and the second data packets can include the same digital content for redundant transmission of the digital content to the second mesh network device. The digital content may be stored in one or more content files. In another embodiment, the PLC link can be used to command and control data. For example, the first data packets can include digital content and the second data packets can include command and control data of one or more command and control messages. For example, the control packets can include routing information, power information, link quality, channel quality, available channels, background scans, network related information, secret passcodes, or the like. Control packets can be used for one or more command and control messages exchanged between the mesh network devices in a command and control plane using the PLC link(s). The data packets, also referred to as main transmission packets, can be exchanged between the mesh network devices in a data plane using the wireless link(s). In another embodiment, the PLC link can be used for data aggregation. For example, the first data packets can include first digital content and the second data packets can include second digital content. This can be used to increase the data transfer rate between the first mesh network device and the second mesh network device.

Also described herein are embodiments to exchange sensitive data, such as a security code, between two mesh network devices. In particular, the sensitive data pertaining to communication on a wireless link between a first mesh network device and a second mesh network device can be exchanged on a PLC link between the first mesh network device and the second mesh network device as described herein.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh network devices, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 5:
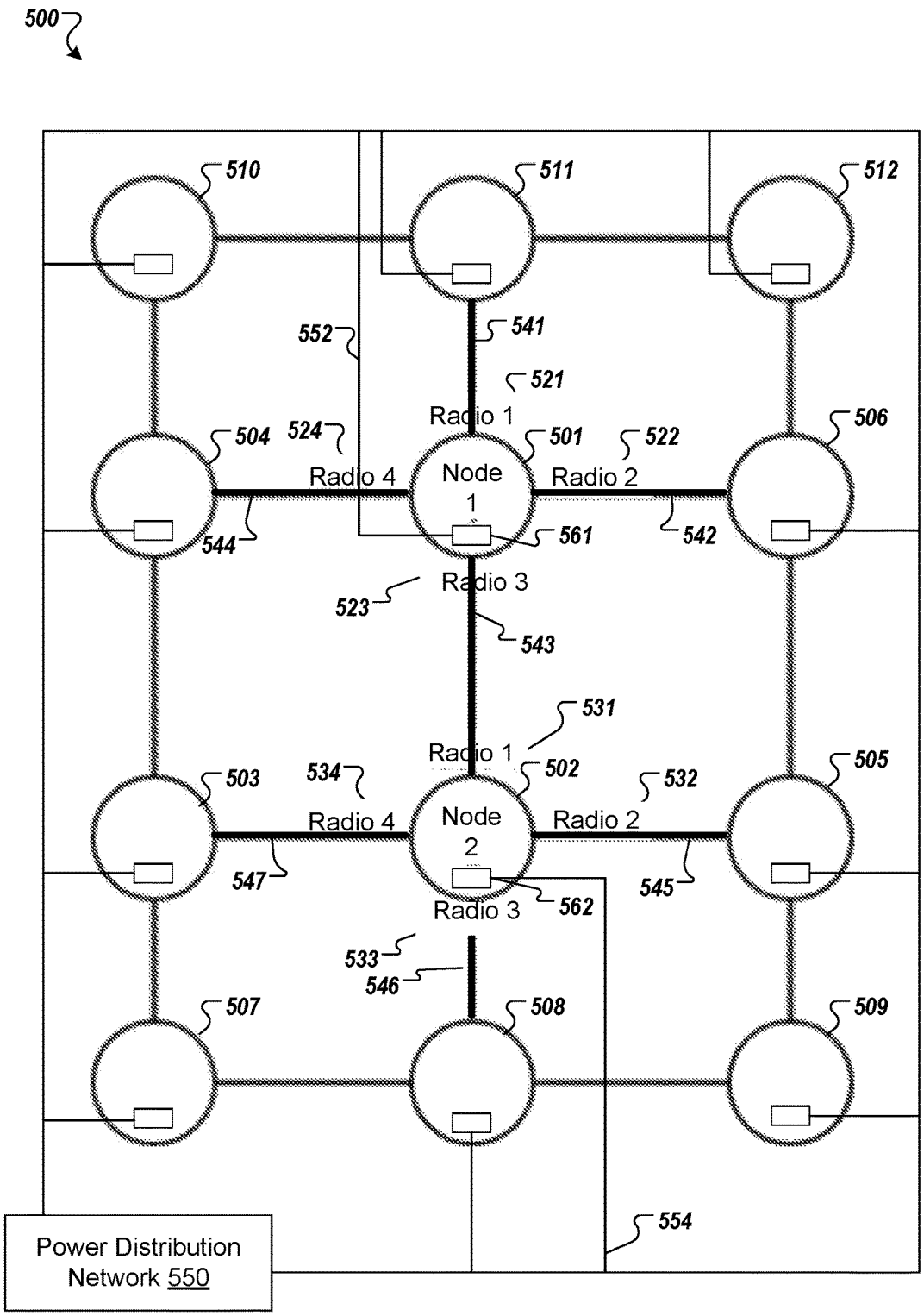
FIG. 5 is a diagram of a WMN with twelve network hardware devices, each having four radios to form a network backbone of peer-to-peer (P2P) wireless connections and PLC connections according to one embodiment.
Figure 6:
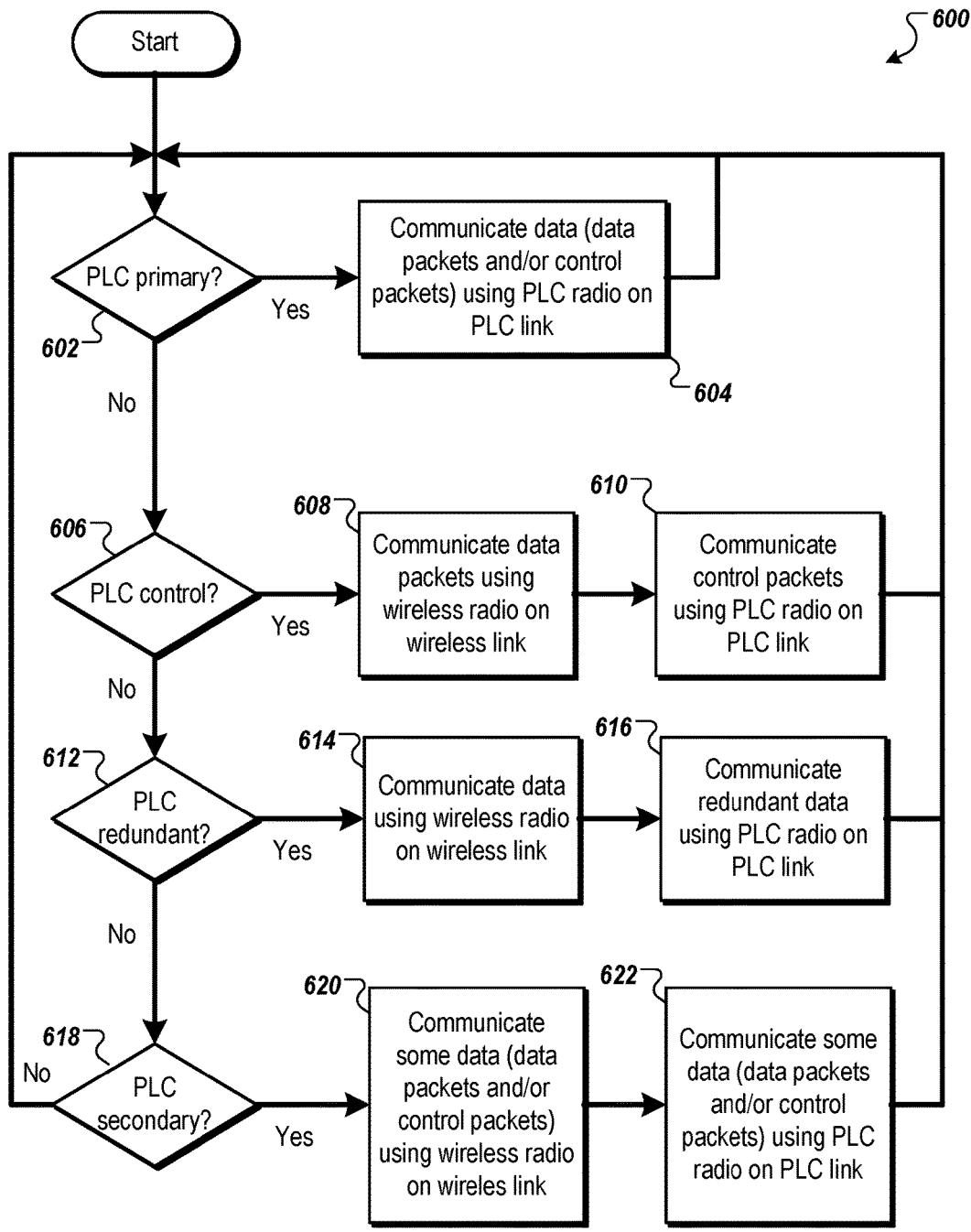
FIG. 6 is a flow diagram of a method of communicating data over a wireless link and a PLC link by a mesh network device a WMN according to one embodiment.
Figure 7:
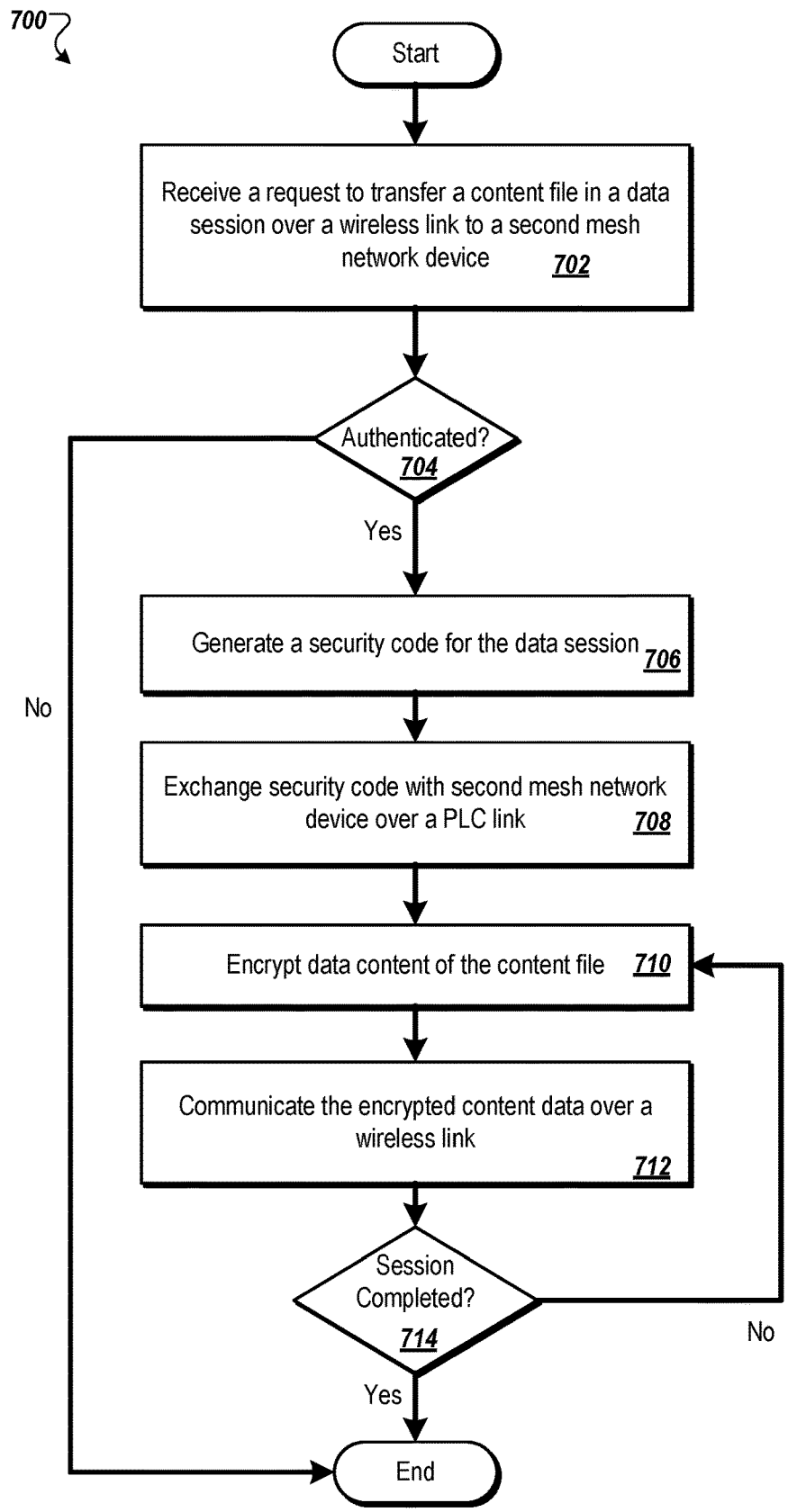
FIG. 7 is a flow diagram of a method of communicating sensitive data over a PLC link by a mesh network device a WMN according to one embodiment.
Figure 8:
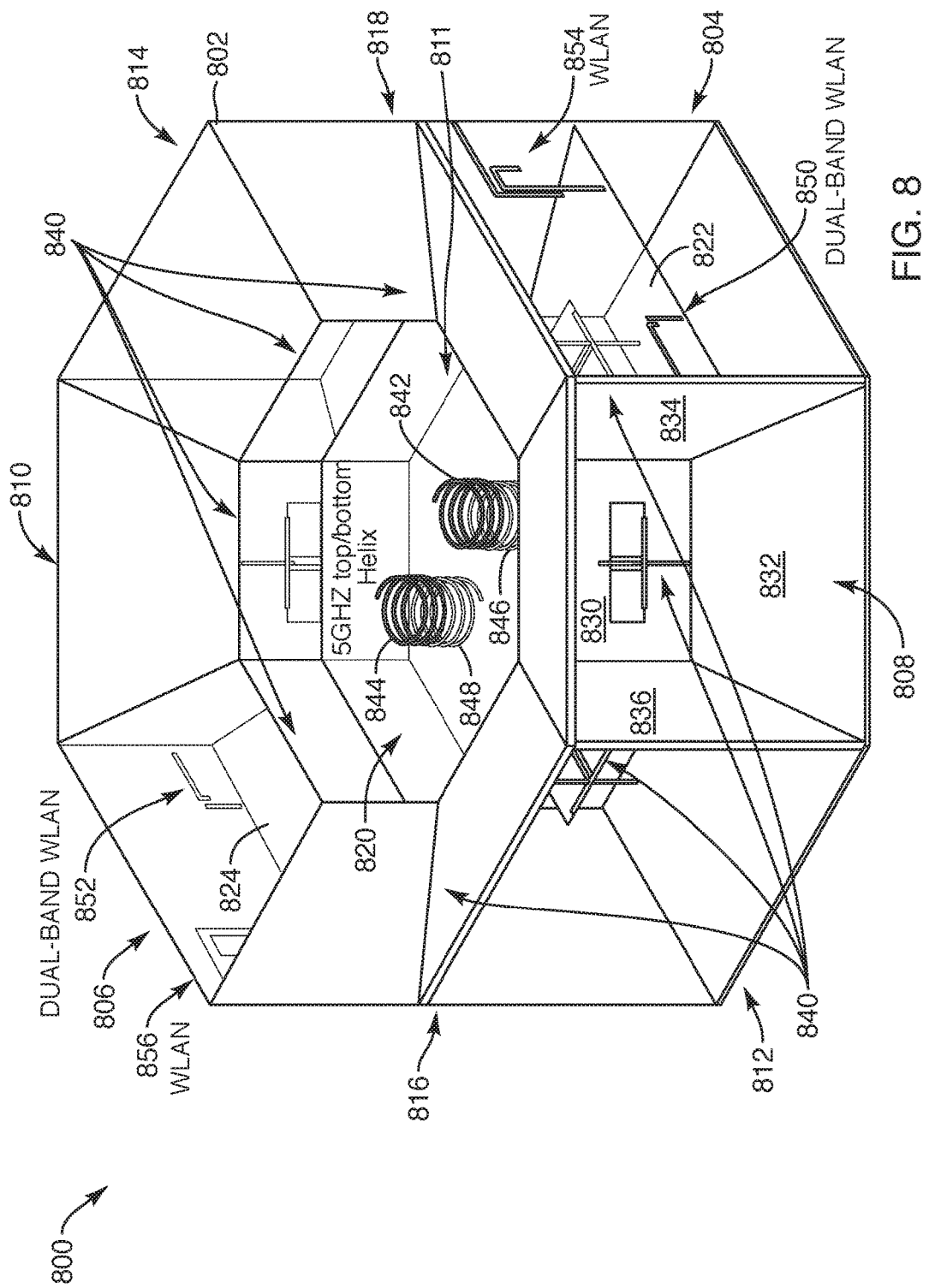
FIG. 8 illustrates a multi-radio, multi-channel (MRMC) network device according to one embodiment.
Figure 9:
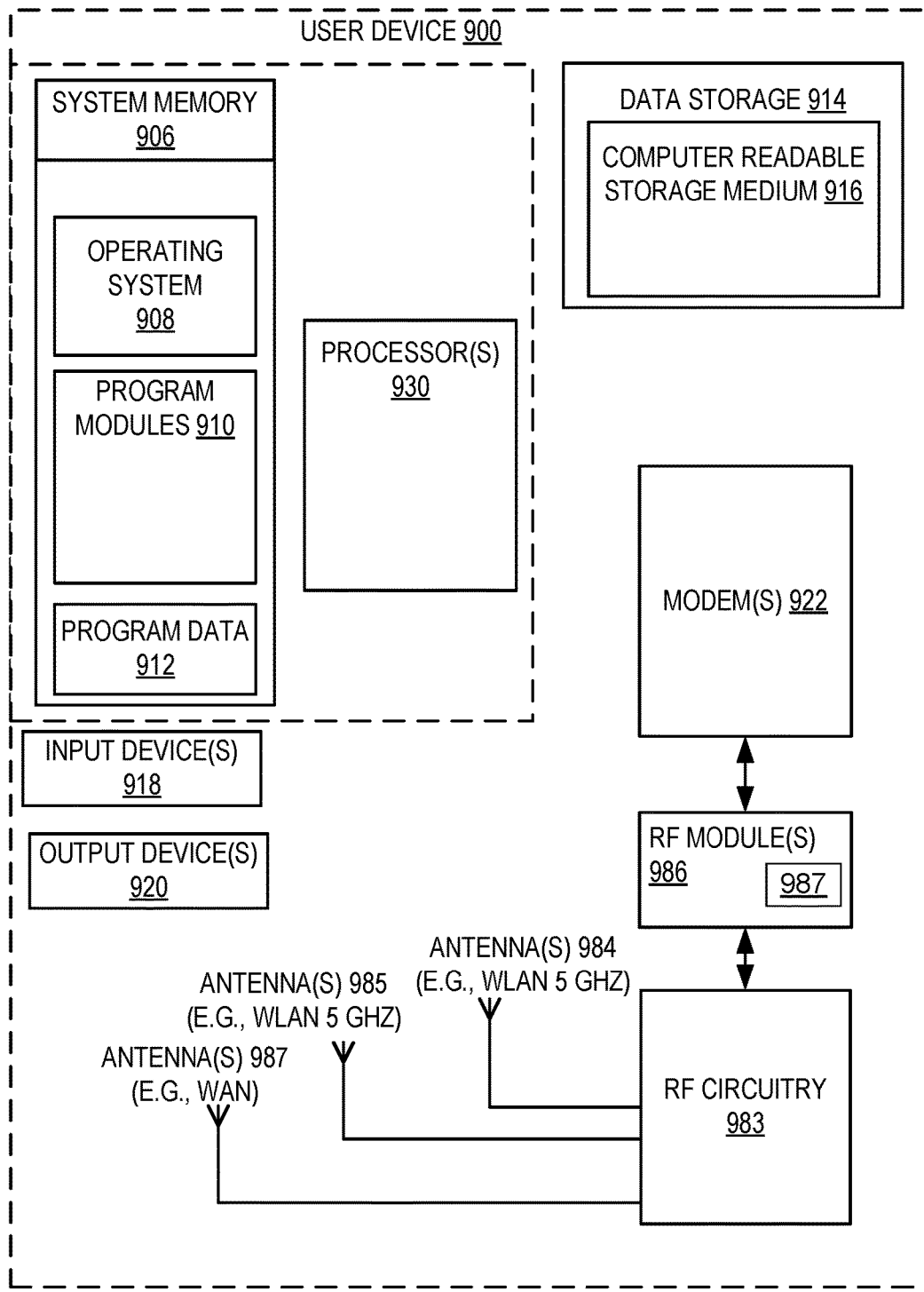
FIG. 9 is a block diagram of a network hardware device according to one embodiment.

FIGS. 1-4 are generally directed to network hardware devices, organized in a wireless mesh network, for content distribution to client consumption devices in environments of limited connectivity to broadband internet infrastructure. The embodiments described herein may be deployed in these network hardware devices, each of which includes a PLC radio for establishing one or more PLC links with one or more of the other network hardware devices. FIGS. 5-7 are generally directed to PLC links and wireless links for routing data on a network backbone of the WMN of mesh network devices. FIGS. 8-9 are generally directed to multi-radio, multi-channel (MRMC) mesh network devices that may implement various embodiments described herein.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node)

of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh network devices 104-110 (also referred to herein as meshbox nodes and network hardware devices). The mesh network devices 104-110 may establish multiple P2P wireless connections 109 between mesh network devices 104-110 to form a network backbone. It should be noted that only some of the possible P2P wireless connections 109 are shown between the mesh network devices 104-110 in FIG. 1. In particular, a first mesh network device 104 is wirelessly coupled to the mini-POP device 102 via a first P2P wireless connection 109, as well as being wirelessly coupled to a second mesh network device 106 via a second P2P wireless connection 109 and a third mesh network device 108 via a third P2P wireless connection. The mesh network devices 104-110 (and the mini-POP device 102) are MRMC mesh network devices. As described herein, the mesh network devices 104-110 do not necessarily have reliable access to the CDN device 107. The mesh network devices 104-110 (and the mini-POP device 102) wirelessly communicate with other nodes via the network backbone via a first set of WLAN channels reserved for inter-node communications. The mesh network devices 102-110 communicate data with one another via the first set of WLAN channels at a first frequency of approximately 5 GHz (e.g., 5 GHz band of the Wi-Fi® network technologies).

Each of the mesh network devices 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh network device 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second mesh network device 106 wirelessly communicates with the client consumption devices via the second set of WLAN channels at a second frequency of approximately 2.4 GHz (e.g., 2.4 GHz band of the Wi-Fi® network technologies).

Each of the mesh network devices 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh network devices, collecting network statistics of the mesh network devices, configuring the mesh network devices, and providing client access to other services. In particular, the mesh network device 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh network devices, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Each of the mesh network devices 104-110 (and the mini-POP device 102) also includes a PLC connection (not illustrated or labeled) to a power distribution network via one or more power lines to wirelessly communicate with one another, as described in more detail below with respect to FIGS. 3A and 5.

Although only four mesh network devices 104-110 are illustrated in FIG. 1, the WMN 100 can use many mesh network devices, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh network devices. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh network device 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh network devices and the radio links between mesh network devices and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh network devices. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh network device becoming unavailable for failure or reboot has minimal impact on availability of content to other users. This means that a single mesh network device is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh network devices that become unavailable, adding, removing, or modifying existing mesh network devices in the WMN 100. The cloud services 120 may also include mechanisms for remote health and management. For example, there may be a remote health interface, a management interface, or both to access the mesh network devices for this purpose. The cloud services 120 can also include mechanisms for securing the WMN 100 and the content that resides in the WMN 100. For example, the cloud services 120 can control device access, DRM, and node authentication.

Figure 2:
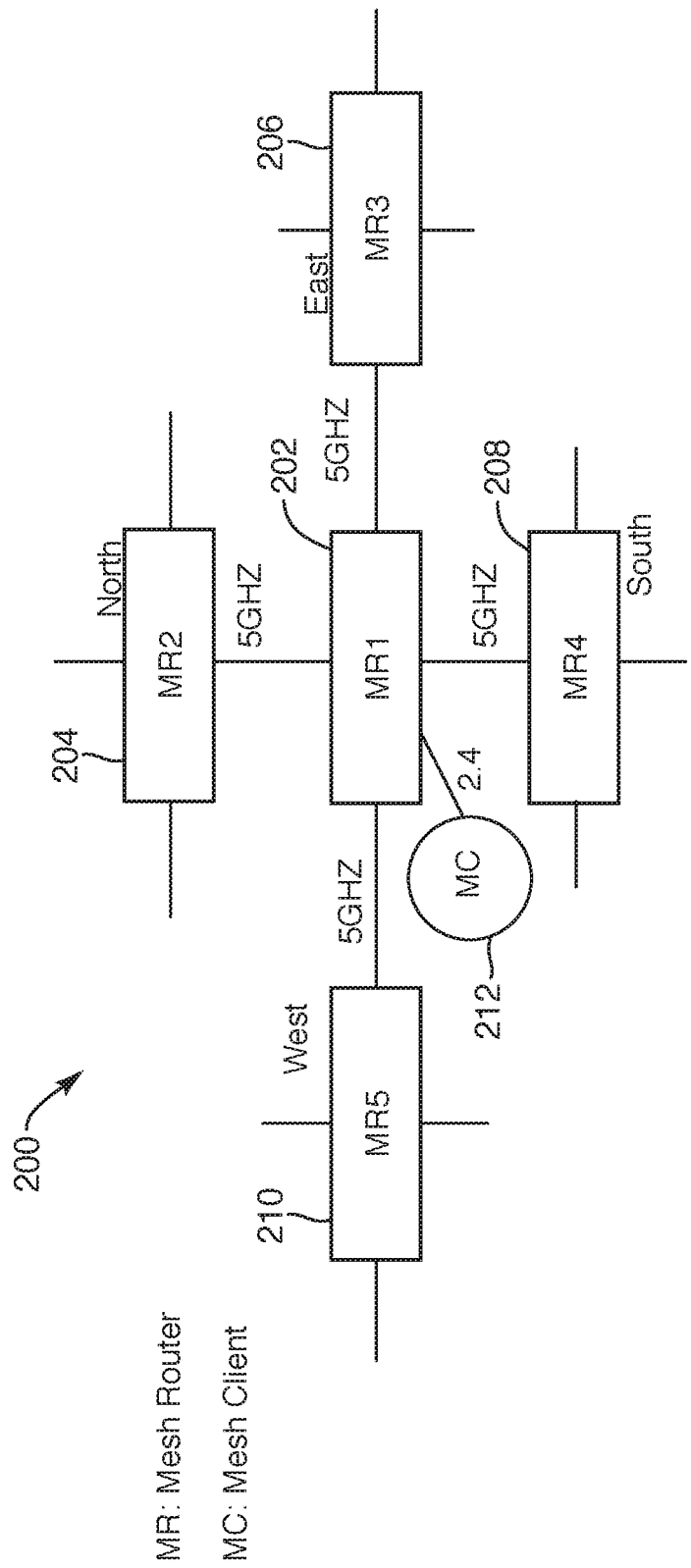
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below.

The network hardware device 202 also includes a PLC connection to the power distribution network via one or more power lines. The PLC connection can be used to communicate data with one or more other network hardware devices, such as network hardware devices 204, 206, 208, and 210. The PLC connections are described in more detail below with respect to FIGS. 3A and 5.

It should be noted that although the depicted embodiment illustrates and describes five mesh network devices, in other embodiments, more than five mesh network devices may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh network devices in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3A:
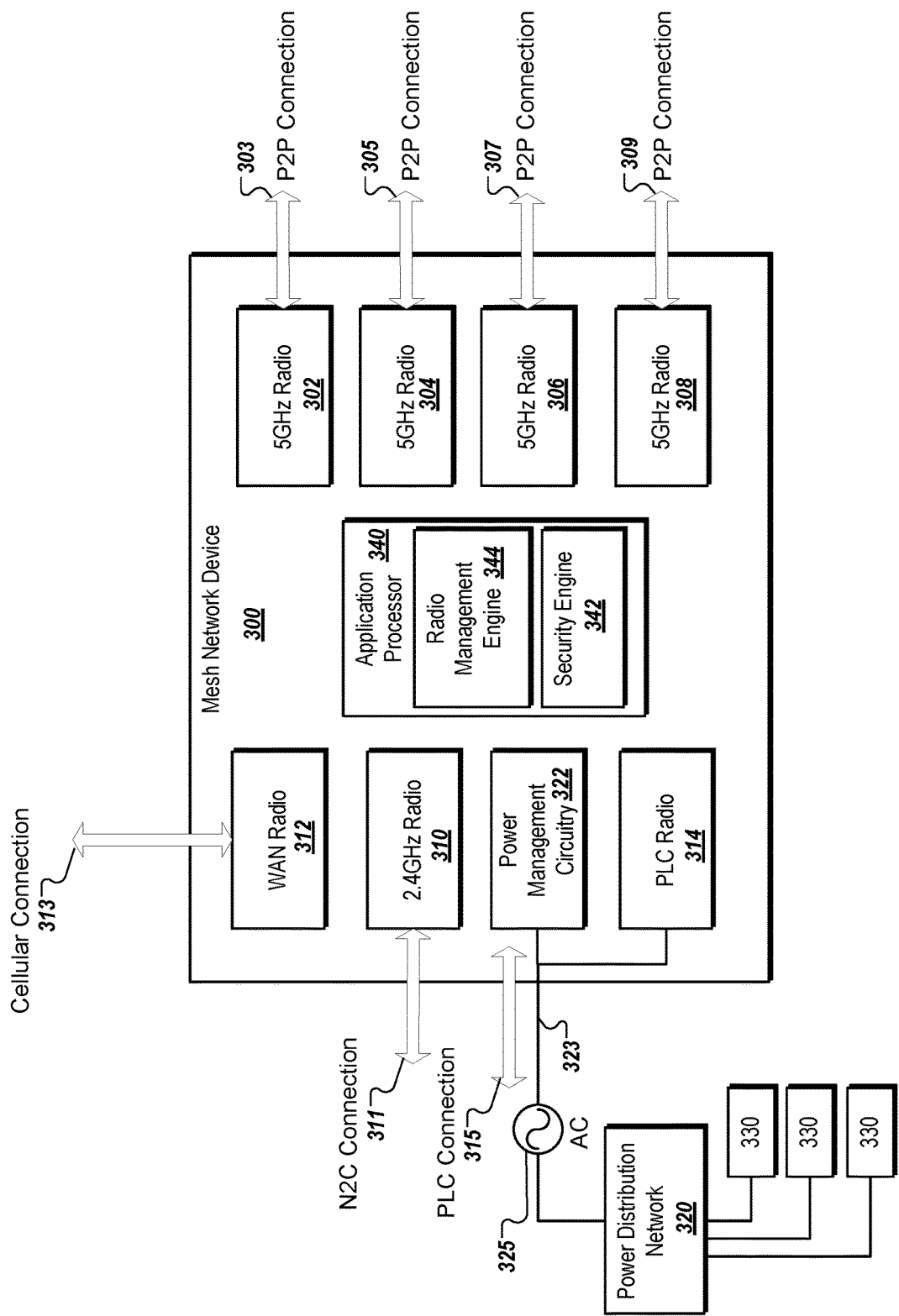
FIG. 3A is a block diagram of a mesh network device with multiple radios according to one embodiment.

FIG. 3A is a block diagram of a mesh network device 300 with multiple radios according to one embodiment. It should be noted that the mesh network device 300 can be the mini-POP device 102 or the mesh network devices 104-110 described above with respect to FIG. 1. The mesh network device 300 includes a first 5 GHz radio 302, a second 5 GHz radio 304, a third 5 GHz radio 306, a fourth 5 GHz radio 308, a 2.4 GHz radio 310, a cellular radio 312, and a PLC radio 314. The first 5 GHz radio 302 creates a first P2P wireless connection 303 between the mesh network device 300 and another mesh network device (not illustrated) in a WMN. The second 5 GHz radio 304 creates a second P2P wireless connection 305 between the mesh network device 300 and another mesh network device (not illustrated) in the WMN. The third 5 GHz radio 306 creates a third P2P wireless connection 307 between the mesh network device 300 and another mesh network device (not illustrated) in the WMN. The fourth 5 GHz radio 308 creates a fourth P2P wireless connection 309 between the mesh network device 300 and another mesh network device (not illustrated) in the WMN. The 2.4 GHz radio 310 creates a N2C wireless connection 311 between the mesh network device 300 and a client consumption device (not illustrated) in the WMN. The cellular radio 312 creates a cellular connection between the mesh network device 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh network devices. In other embodiments, multiple cellular radios may be used to create multiple cellular connections.

In the depicted embodiment, the PLC radio 314 creates a PLC connection 315 between the mesh network device 300 and one or more other mesh network device 330 in a WMN. The PLC connection 315 is established over one or more power lines of a power distribution network 320. As illustrated, the PLC radio 314 is coupled to a power line 323 that is used to supply power to the mesh network device 300. The PLC radio 314 can communicate with the other mesh network devices 330 that are also connected to the same power distribution network 320 via respective power lines. The PLC radio 314 can communicate using a PLC communication protocol that uses electrical wiring to simultaneously carry both data, and AC electric power transmission or electric power distribution. PLC is also known as power-line carrier, power-line digital subscriber line (PDSL), mains communication, power-line telecommunications, power-line networking (PLN), broadband over power lines (BPL). Some PLC technologies limit themselves to one type of wire (such as premises wiring within a single building), but some can cross between two levels (for example, both the power distribution network and premises wiring). Various data rates and frequencies are used in different situations. The PLC radio 314 can be used for high speed data transmission within the internal wiring of a structure, as well as mains power wirings to reach other internal wirings of other structures. As such, the other mesh network devices 330 may be located in the same building (house, apartment, office) as the mesh network device 300, as well as located in other buildings. The PLC radio 314 uses the AC power lines to push data between different mesh networked across a building or across multiple buildings. The PLC technology can support data rates, such as between 20 Mbps and 1.3 Gbps, depending on the distance of the power lines and the condition of the power line cables between the nodes. Even in the event of low throughput case in PLC, the latency is still considerable low due to the low interference factors that exists on power lines.

Generally in a mesh network, mesh network devices need to communicate among each other to coordinate communications, such as to assign transmission time slots, exchange security codes, exchange routing information, or the like. In mesh networks, it is important for the control massages to be controlled by devices within the mesh network itself to assign the right priority and destination for the ongoing packets. Furthermore, finding the right medium for commination massages can pose a challenge to the overall network. Using the same wireless medium of the main transmission session may degrade throughput and increase latency, which may impact the whole network performance. Using the same wireless medium of the main transmission session can impact synchronization between the command and control packets and the main transmission packets since command and control messages should suffer no latency. Also, if the wireless medium is highly contaminated with interference (or some mesh nodes are unresponsive), the whole mesh network may lose some of the control packets at unresponsive nodes, hidden nodes, or where the interference is too great, which may also affect the performance of the whole mesh network. On the other hand, using a different wireless medium, such as cellular technologies, for the control and command messages, the control medium and corresponding technology need to have low latency and low dependability on passing the control massages fast enough to assure synchronizations. Transmitting command and control messages using wireless licensed mediums, like cellular, have dependencies on a cellular network that may result in the messages not getting the proper priority for the control packets since the cellular network will decide the priority of the packets, instead of the mesh network itself. Also, wireless unlicensed mediums using technologies like the Zigbee® or Bluetooth® technologies may have an unpredictable medium performance given the interference and out-of-network devices that operate in the same medium.

The embodiments described herein have an added PLC radio in the mesh network devices to allow for a secondary path for the he command and control massages to be exchanged between different mesh network devices. The PLC radio also permits a redundancy path for data traffic between the mesh network devices. This PLC link may be used for a primary link for data traffic, a secondary link for data traffic, or as part of a hybrid link with some data traffic communicated by the hybrid link and aggregated with data communicated with a wireless link. As described above, the PLC technology can support data rates between 20 Mbps and 1.3 Gbps depending on the distance between mesh network device and the condition of the power lines between the mesh network devices. The low latency and high availability of PLC communications, the PLC radio 314 can be used to meet throughput requirements for data, control, or both.

In one embodiment, a main power supply line, such as power line 323 is coupled to power management circuitry 322 of the mesh network device 300. The power management circuitry 322 may be any power circuit from a simple power circuit, like a voltage regulator, to a complex power manager device, like a standalone integrated circuit that manages power of the mesh network device 300 using hardware, software, firmware, or any combination thereof. The power management circuitry 322 may also work in connection with an internal power source (not illustrated in FIG. 3A) within the mesh network device. In one embodiment, the power management circuitry 322 is the power management and charging system 434 described below with respect to FIG. 4 The power management circuitry 322 can be connected to a power supply 325 (e.g., a 240V outlet, a 120V outlet, or the like) via the power supply line 323. The power supply 325 can be part of a power distribution network 320, such as building wiring or a power grid of a geographic area. The power management circuitry 322 can also connect to a battery (not illustrated in FIG. 3A) that can provide power in the event of power loss. In the event of power loss, the PLC radio 314 can be powered down (as well as the WLAN radios), but the cellular radio can be powered by the battery to send an SOS message as described below with respect to FIG. 4. The power management circuitry 322 may provide a 15V power supply up to 21 watts to the mesh network device 300.

The main power supply line 323 supplies the needed AC power to the mesh network device 300 and the same main power supply line 323 can be used to push data into the power lines. PLC radio 314 can operate like the other radios 302-310, like the 2.4 GHz radio 310 that wirelessly communicates with another 2.4 GHz radio over the air, but the PLC radio 314 communicates data over a physical medium of power lines. In one implementation, a MNCS service hosted by a cloud computing system can designate the PLC radio 314 to be a group owner a PLC network of other mesh network devices containing a PLC radio. In other embodiments, multiple PLC radios can be assigned to be group owners of the PLC network by the MNCS service. The group owner of a PLC network can assign PLC addresses to each of the PLC radios on the PLC network. This assigned PLC address can be paired with a node MAC address as described in more detail below. In another embodiment, the PLC radio 314 can be assigned a PLC address by another PLC radio on the PLC network, such as a PLC radio designated as a group owner. The group owner can build the PLC network by assigning PLC addresses to PLC radios on the PLC network. The group owner can also determine when PLC radios can communicate over the power lines. Any one of the PLC radios in mesh network devices in the WMN can be the group owner, and typically, the first PLC radio to start communicating will become the group owner. Thus, the PLC radio 314 can assign addresses of other PLC radios or be assigned a PLC address. For example, once the mesh network device 300 is initialized (e.g., at installation or at power-up event), a discovery mode may be initiated to determine PLC availability and capability of the other mesh network devices 330. During discovery mode, one of the PLC radios can be assigned group owner and the group owner can assign PLC addresses to the PLC radios on the PLC network. The PLC radios can be organized according to PLC standard protocols in an organized scheme. For example, the PLC radio 314 can operate according to any one of the HomePlug® standards. The HomePlug® standards, developed by HomePlug Powerline Alliance, are a collection of power line communications specifications with each offering unique performance capabilities and coexistence or compatibility with other specifications. The PLC radio 314 can use different standards based on where the mesh network device 300 operates, such as in geographic areas that use different power requirements, such as in United States and Asia. The mesh network device 300 can report the PLC addresses the MNCS service so that the MNCS is aware of the PLC network, in addition to node media access control (MAC) addresses of the mesh network devices in the WMN. In other embodiments, the PLC network of PLC radios can communicate and/or initialization the PLC network without involvement of the MNCS service. In another embodiment, the PLC radio 314 can communicate with other PLC radios using unorganized schemes.

As described herein, the PLC radio 314 and corresponding PLC connection 315 can be used as a redundancy communication path for data communications between the mesh network device 300 and any one of the other mesh network devices 330. In one embodiment, the mesh network device 300 communicates data packets via the 5 Ghz radio 302 over the P2P connection 303. This wireless connection can have a bandwidth speed of 70 Mbps. Especially for the case where the data packets contain video, such as live video content or video on demand (VOD) content, it may be important to have bit integrity. To ensure bit integrity, the mesh network device 300 can use the PLC radio 314 and the PLC connection 315 as a redundant communication path. That is, the mesh network device 300 sends the same data packets containing the same video via the PLC radio 314 concurrently while the data packets are communicated via the wireless P2P connection 303 via the 5 GHz radio 302. By communicating the data on the primary communication path via the P2P connection 303 and the redundant communication path via the PLC connection 315. When processing the video of the data packets, if any bits, packets, or other amounts of data are corrupted or not received, the redundant data packets received over the redundant communication path can be used to supplement, replace, or otherwise correct the affected data. In other embodiments, the PLC communication path is the primary data path and the wireless communication path is the secondary data path. In one embodiment, the 5 Ghz radio 302 communicates the data packets as user datagram protocol (UDP) data packets and the PLC radio 314 communicates the redundant data packets as UDP data packets as well. Applications that do not require reliable data stream service may use the UDP, which provides a connectionless datagram service that emphasizes reduced latency over reliability. Because redundant data packets are sent at the same time, UDP data packets can be used to reduce latency of the data transfer, regardless of the lower reliability of UDP. In other embodiments, the 5 GHz radio 302 and the PLC radio 314 communicate the data packets as Transmission Control Protocol (TCP) data packets. TCP data packets sent over the Internet Protocol (TCP/IP) can provide reliable, ordered, and error-checked delivery of a stream of octets between applications running on hosts communicating over an IP network. TCP uses acknowledgments (ACKs) and not ACKs (NACKs) to ensure reliability, but does not have as high of throughput as UDP. UDP assumes that the receiver received the data, such as done in live streaming of video. Loss in data or corruption in data sent using UDP may result in pixilation in the video or disruptions in the audio, but the redundant data packets can be used to correct for the loss or corruption to ensure reliability and quality of service in a timely manner. That is, the low latency of the redundant communication path can be used to ensure reliability, but not at the expense of timing as with traditional TCP packet based communications of the same content. In other terms, the mesh network device 300 can send UDP data packets on both a wireless link and a PLC link to the second mesh network device to ensure reliability, quality, and timing. In other embodiments, the PLC link can be used to send any data (e.g., control packets of a command and control message) that is not payload data (e.g., data packets of the media content). The control packets of a command and control message may include routing information, power control information, quality link information, channel quality information, wireless medium information, availability channel, background scans, network-related information, coding scheme, secret codes, packet destination, maintenance commands, priority assignment for the main data packets, scheduling information, or the like.

Alternatively, other combinations of TCP and UDP data packets and other types of data packets may be used for the primary and secondary communication paths. It should be noted that bandwidth speed of the wireless link may be 100 Mbps, while the redundant link may be double, triple or more the bandwidth speed to ensure redundancy. In one case, the 2.4 GHz radio 310 can have a bandwidth speed 80 Mbps, while the PLC radio 314 can have a bandwidth speed of 1.3 Gbps. In another embodiment, the 5 GHz radio 302 can have a bandwidth speed 100 Mbps, while the PLC radio 314 can have a bandwidth speed of 1.3 Gbps.

In another embodiment, as described herein, the PLC radio 314 and corresponding PLC connection 315 can be used as a primary communication path for data communications between the mesh network device 300 and any one of the other mesh network devices 330. In one embodiment, the mesh network device 300 communicates data packets via the PLC connection 315 using the PLC radio 314. This physical wired connection over power lines can have a bandwidth speed between approximately 20 Mbps to approximately 1.3 Gbps.

In another embodiment, as described herein, the PLC radio 314 and corresponding PLC connection 315 can be used as a secondary communication path for data communications between the mesh network device 300 and any one of the other mesh network devices 330. In one embodiment, the mesh network device 300 communicates first data packets via the P2P connection 303 using the 5 GHz radio 302 and second data packets via the PLC connection 315 using the PLC radio 314. For example, when the wireless link has a bandwidth speed of 50 Mbps, but a bandwidth speed requirement of 100 Mbps are needed, the mesh network device 300 can use the wireless link to transmit data packets using the 50 Mbps, while using the PLC link to transmit additional data packets using another 50 Mbps to meet the bandwidth speed requirement. At the destination, the data from both links can be aggregated. An aggregation configuration can be setup between nodes using one or more command and control messages to establish how the mesh network device 300 is to transmit the data over the two links and aggregated at a destination mesh network device.

It should be noted that when the mesh network uses the same transmission medium to send both data packets and control packets, the communication session for sending the data packets needs to be interrupted to transmit the control packets. As the mesh network scales in size, the amount of command and control messages (e.g., control packets) being exchanged also increases, possibly resulting in interruptions that cause throughput to fluctuate. In one embodiment, the PLC radio 314 provides the secondary communication path to send the command and control messages, reducing the number of interruptions to the communication sessions in which data packets are transmitted. In one implementation, the wireless connection can have a bandwidth speed of approximately 50 Mbps to approximately 180 Mbps, whereas the physical wired connection over power lines have a bandwidth speed between approximately 20 Mbps to approximately 1.3 Gbps. Since the physical wired connection is not a redundant communication path, the bandwidth speed does not need to be the same or higher than the primary communication path. The bandwidth speed of the PLC connection 315, however, typically will be as fast as or faster than the P2P connection 303. It should also be noted that the other radios of the mesh network device 300 can be used as the primary communication path, while the PLC radio 314 can be used for the secondary communication path or the redundant communication path. At the receiving node, the receiving node can receive duplicate data from the two sources, such as data streams. The receiving node can process one of the data streams from one of the sources, while discarding the data from the other stream. When an error in the data is detected in the one stream being processed, the receiving node can use the data from the other stream to correct the data. For example, the other stream can be buffered for a limited time to ensure the receiving node has the ability to reconstruct, correct, or otherwise remedy the error in the data in the original stream.

In another embodiment, a system of devices can be organized in a WMN. The system may include a single ingress node for ingress of content files into the wireless mesh network. In one embodiment, the single ingress node is a mini-POP device that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP device, as described herein. When the mini-POP device does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP device is coupled to a storage device to store the content files as original content files for the wireless mesh network. A point-to-point wireless link may be established between the mini-POP device and a CDN device. In another embodiment, the mini-POP device is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP device and a POP device of an ISP. In one embodiment, the point-to-point wireless link is a microwave link (e.g., directional microwave link) between the mini-POP device and the CDN device. In another embodiment, the mini-POP device stores an index of the content files store in attached storage devices.

In some embodiments, a mesh network architecture includes multiple mesh network devices organized in a self-contained mesh network. The self-contained mesh network may be self-contained in the sense that content resides in, travels through, and is consumed by nodes in the mesh network without requiring the content to be fetched outside of the mesh network. Each of the mesh network devices includes a first radio for inter-node communications with the other nodes on multiple P2P channels, a second radio for communications with client consumption devices on N2C channels. The mesh network architecture also includes a mini-POP device including a radio for inter-connection communications with at least one of the mesh network devices on a P2P channel. The mesh network architecture also includes a storage device coupled to the mini-POP, the storage device to store content files for distribution to a requesting client consumption device. The mini-POP device may be the only ingress point for content files for the self-contained mesh network. The storage devices of the mini-POP device may be internal drives, external drives, or both. During operation, a first node of the mesh network devices includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. A scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link-peak PHY rate.

In another embodiment, a system includes a POP device having access to content files via at least one of data storage coupled to the POP device or a first point-to-point connection to a first device of an ISP. The system also includes multiple mesh network devices, organized in a WMN, and at least one of the mesh network devices is wirelessly coupled to the POP device. The WMN is a mesh topology in which the multiple mesh network devices cooperate in distribution of the content files to client consumption devices that do not have access to reliable access to the server device of the CDN or in an environment of limited connectivity to broadband infrastructure. A first node of the multiple mesh network devices is a multi-radio, multi-channel (MRMC) device that includes multiple P2P connections to form parts of a network backbone in which the first node wireless connects to other mesh network devices via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

In a further embodiment, the mesh network device includes a power supply line, a processing device, a first wireless radio, and a first PLC radio. The power supply line (e.g., 323) coupled to a power distribution network (e.g., 320). The processing device is coupled to the power supply line, the first wireless radio, and the first PLC radio. The processing device is operable to communicate, using the first wireless radio, first data with a second mesh network device over a wireless link between the first wireless radio and a first wireless radio of the second mesh network device. The processing device is also operable to communicate, via the power distribution network via the PLC radio, second data with the second mesh network device over a PLC link between the first PLC radio and a first PLC radio of the second mesh network device. In a further embodiment, the mesh network device further includes a second wireless radio coupled to the processing device. The processing device can communicate, using the second wireless radio, third data with a third mesh network device over a second wireless link between the second wireless radio and a first wireless radio of the third mesh network device. The processing device can also communicate, via the power distribution network via the PLC radio, fourth data with the second mesh network device over a second PLC link between the first PLC radio and a first PLC radio of the third mesh network device. The mesh network device may include additional wireless radios as well.

In one embodiment, the first data includes data packets containing digital content and the second data includes data packets containing the same digital content. In this embodiment, the first data and the second data are redundant data. In another embodiment, the first data includes data packets containing digital content and the second data includes control packets. The control packets may include at least one of: routing information; link quality information; channel quality information; available channel information; background scan information; and/or wireless mesh network information. In this embodiment, the first data is main transmission data packets in a data plane and the second data is control packets in a control plane. In another embodiment, the first data includes data packets containing first data packets of a content file and the second data includes second data packets of the content file. In this embodiment, the first data packets and the second data packets can be aggregated at a destination node.

In one embodiment, the processing device of the mesh network device can determine that a current link quality metric of the wireless link is less than a specified amount. In another embodiment, the processing device can determine a current throughput metric, an error bit rate, or the like. Since the two mesh network devices are operated in the same WMN, the throughput metric can easily be determined. In other cases, the error bit rate may be measured and it may be indicative of the throughput without measuring throughput metrics that utilize communications back and forth between the mesh network devices. The processing device can communicate, using the PLC radio, additional data packets of a content file to the second mesh network device over the PLC link, such as when the current link quality metric of the wireless link is less than the specified amount. In another embodiment, when the current link quality metric is less than the specified amount, the processing device can communicate data with the first wireless radio and the PLC radio. For example, the processing device communicates, using the first wireless radio, a first subset of additional packets of a content file to the second mesh network device over the wireless link and communicates, using the PLC radio, a second subset of the additional packets of the content file to the second mesh network device over the PLC link. In another embodiment, the processing device of the mesh network device can determine that the wireless link is not responsive. The processing device can communicate, using the PLC radio, additional data packets of a content file to the second mesh network device over the PLC link, such as when the wireless link is not responsive. In another embodiment, the processing device can determine an amount of remaining data of the content file to be transferred, a current data rate of the wireless link, and a current data rate of the PLC link. The processing device can communicate, using the first wireless radio, a first subset of additional packets of the content file to the second mesh network device over the wireless link in view of the current data rate of the wireless link and communicate, using the PLC radio, a second subset of the additional packets of the content file to the second mesh network device over the PLC link in view of the current data rate of the PLC link. As described herein, the first data and the second data can be communicated as UDP packets. Alternatively, other types of data packets may be used for the first data, the second data, and the additional packets, including the first subset and the second subset. In another embodiment, the processing device can monitor a bit error rate of a wireless link and determine that the bit error rate is more than a specified amount. While communicating some data on the wireless link, the processing device can also communicate some additional data on a PLC link. In another embodiment, the processing logic can determine a presence of interference on the wireless link while communicating first data packets of the digital content and communicate, using the PLC radio, second data packets of the digital content to the second mesh network device over the PLC link. In another embodiment when the presence of interference is determined, the processing logic communicates, using the first wireless radio, a first subset of second data packets of the digital content to the second mesh network device over the wireless link and communicates, using the PLC radio, a second subset of the second data packets of the content file to the second mesh network device over the PLC link.

In another embodiment, a mesh network device includes a power supply line and an application processor. The application processor processes data signals in connection with communicating with other mesh network devices and client consumption devices in a WMN. The mesh network device includes a first WLAN radio, a second WLAN radio, and a PLC radio. The first WLAN is coupled to a first WLAN antenna and the second WLAN radio is coupled to a second WLAN antenna. The PLC radio is coupled to the application processor and the power supply line. The application processor can communicate first data to a second mesh network device over a first wireless connection using the first WLAN radio. The application processor can communicate second data to a third mesh network device over a second wireless connection using the second WLAN radio. The application processor can communicate third data to at least one of the second mesh network device or the third mesh network device over a wired connection using the PLC radio. The wired connection is made between one or more power lines that are used to supply power to the mesh network devices. In one embodiment, the third data is redundant data of the first data. In another embodiment, the third data is control data. In another embodiment, the third data is a subset of a content file, where another subset of the content file is being sent via the first WLAN radio or the second WLAN radio, respectively.

In another embodiment, the application processor can monitor throughput on the first wireless connection by the first WLAN radio and throughput on the second wireless connection of the second WLAN radio. The application processor determines that the throughput on the first wireless connection is less than a specified amount. While communicating the second data on the second wireless connection using the second WLAN radio, the application processor can communicate some or all of remaining data packets of the first data to the second mesh network device over the wired connection using the PLC radio. The third data includes the some or all of remaining data packets of the first data. In another embodiment, the application processor monitors a bit error rate on the first wireless connection by the first WLAN radio and a bit error rate on the second wireless connection of the second WLAN radio. The application processor determines that the bit error rate on the first wireless connection is more than a specified amount. While communicating the second data on the second wireless connection using the second WLAN radio, the application processor communicates some or all of remaining data packets of the first data to the second mesh network device over the wired connection using the PLC radio. The third data may include the some or all of remaining data packets of the first data.

In another embodiment, the application processor can monitor bit error rate (or packet error rate) of the first wireless connection by the first WLAN radio and bit error rate on the second wireless connection of the second WLAN radio. Alternatively, the application processor can monitor other metrics of link quality. In some cases there are special packets in the standard communication protocol, such as 802.11 standards, that can specify a link quality metric. The application processor can use the link quality metric to determine how much data to send on the first wireless connection and how much data to send on the second wireless connection.

In the depicted embodiment, the mesh network device 300 includes an application processor 340 that is coupled to the various radios described herein. The application processor 340 can execute a radio management engine 342, a security engine 344, or both. The radio management engine 342 can be a computer program that may operate as a background process, such as a daemon that is started at boot time and performs the tasks described above with respect to communications using the different radios, such as the wireless radio and the PLC radios described above. The radio management engine 342 can configure hardware, run scheduled tasks, as well as perform the variety of tasks described above to communicate data packets or control packets as described herein. In one embodiment, the radio management engine 342 can communicate with the MNCS hosted in the cloud. The processing logic of radio management can be implemented locally in the radio management engine 342 at the application processor 340. Alternatively, some or all of the processing logic of the radio management can be performed in a radio management engine hosted in the cloud as part of the MNCS. Alternatively, the MNCS can implement a radio management engine and the application processor can implement the radio management engine 342 as a distributed system. Alternatively, the radio management engine 342 performs the various operations and reports the status, configuration, or other information to the MNCS. In one embodiment, the radio management engine 342 performs the method 600 described below with respect to FIG. 6. Alternatively, the radio management engine 342 can perform other operations as described herein.

The security engine 344 can be a computer program that may operate as a background process, such as a daemon that is started at boot time and performs the tasks described herein with respect to exchanging security codes using the PLC radio as described herein. The security engine 344 can perform the variety of tasks described herein regarding communicating security codes between the mesh network devices in a separate communication medium than a main transmission medium. The security codes can be used to encrypt data being exchanged on the main transmission medium. In one embodiment, the security engine 344 can communicate with the MNCS hosted in the cloud. In one embodiment, the MNCS can implement a security engine and the application processor can implement the security engine 344 as a distributed system. Alternatively, the security engine 344 performs the various operations and reports the status, configuration, or other information to the MNCS. In one embodiment, the security engine 344 performs the method 400 described below with respect to FIG. 4. Alternatively, the security engine 344 can perform other operations as described herein.

In one embodiment, the application processor 340 processes data signals in connection with communicating with other mesh network devices and client consumption devices in a WMN. The application processor 340 may be coupled to a first WLAN radio that is coupled to a first WLAN antenna, a second WLAN radio that is coupled to a second WLAN antenna, and the PLC radio 341 that is coupled to a power supply line that supplies power to the mesh network device 300. The application processor 340 communicates a first security code to a second mesh network device over a wired connection (e.g., 323) using the PLC radio 314. The application processor 340 encrypts first Data using the first security code to obtain encrypted first Data. The application processor 340 communicates the encrypted first Data to the second mesh network device over a first wireless connection using the first WLAN radio. The application processor 340 can also communicate a second security code to a third mesh network device over a wired connection using the PLC radio 314. The application processor 340 encrypts second Data using the second security code to obtain encrypted second Data. The application processor 340 communicates the encrypted second Data to the third mesh network device over a second wireless connection using the second WLAN radio.

In a further embodiment, the application processor 340 can encrypt the first security code using a PLC security code previously exchanged between the mesh network device 300 and the second mesh network device over the wired connection. In a further embodiment, the application processor can send a PLC security code to the second mesh network device over the wired link using the PLC radio during a specified time slot previously negotiated between the mesh network device and the second mesh network device.

In another embodiment, the application processor receives a request for a data session to transfer a content file from the mesh network device 300 to the second mesh network device over the first wireless connection. The mesh network device 300 authenticates the second mesh network device as an authorized device in a WMN. Alternatively, the MNCS can authenticate both the mesh network device 300 and the second mesh network device. The application processor 340 communicates, using the PLC radio, a PLC security code with a second PLC radio at the second mesh network device. The application processor 340 can randomly generate a string of characters as the security code for the data session and encrypt, using the PLC security code, the string of characters to obtain an encrypted security code for the data session. The application processor 340 communicates, using the PLC radio, the encrypted security code with the second PLC radio.

In another embodiment, a WMN includes at least a mini-POP device having at least one of a first wired connection to an attached storage device and a point-to-point wireless connection to a server of a CDN, a first mesh network device, and a second mesh network device. The first mesh network device includes a first application processor, a first alternating current (AC) power line coupled to a power distribution network, a first WLAN radio, a second WLAN radio, and a first PLC radio, each coupled to the first application processor. The first AC power line supplies power to the first mesh network device. The first WLAN radio wirelessly communicates with the mini-POP device. The PLC radio is also coupled to the first AC power line. The second mesh network device includes a second application processor, a second AC power line coupled to the power distribution network, a third WLAN radio, and a second PLC radio. The first application processor generates a security code for a data session for communications over a wireless link between the second WLAN radio and the third WLAN radio. The first application processor can send, using the first PLC radio, the security code for the data session over a PLC link between the first PLC radio and the second PLC radio via the power distribution network. The first application processor can encrypt digital content using the security code to obtain encrypted data and send, using the second WLAN radio, the encrypted data via the wireless link between the second WLAN radio and the third WLAN radio.

In a further embodiment, the first application processor can generate a PLC security code for communications over the PLC link. The first application processor sends, using the first PLC radio, the PLC security code over the PLC link. The first application processor encrypts the security code for the data session using the PLC security code to obtain an encrypted security code. The first application processor sends the encrypted security code over the PLC link.

In a further embodiment, the first application processor can schedule a time slot in which to send the PLC security code over the PLC link and can send the time slot to the second PLC radio over the PLC link using the first PLC radio. The first application processor sends the encrypted security code over the PLC link at the time slot.

Additional embodiments regarding the security engine 344 are described below with respect to FIG. 7.

Figure 3B:
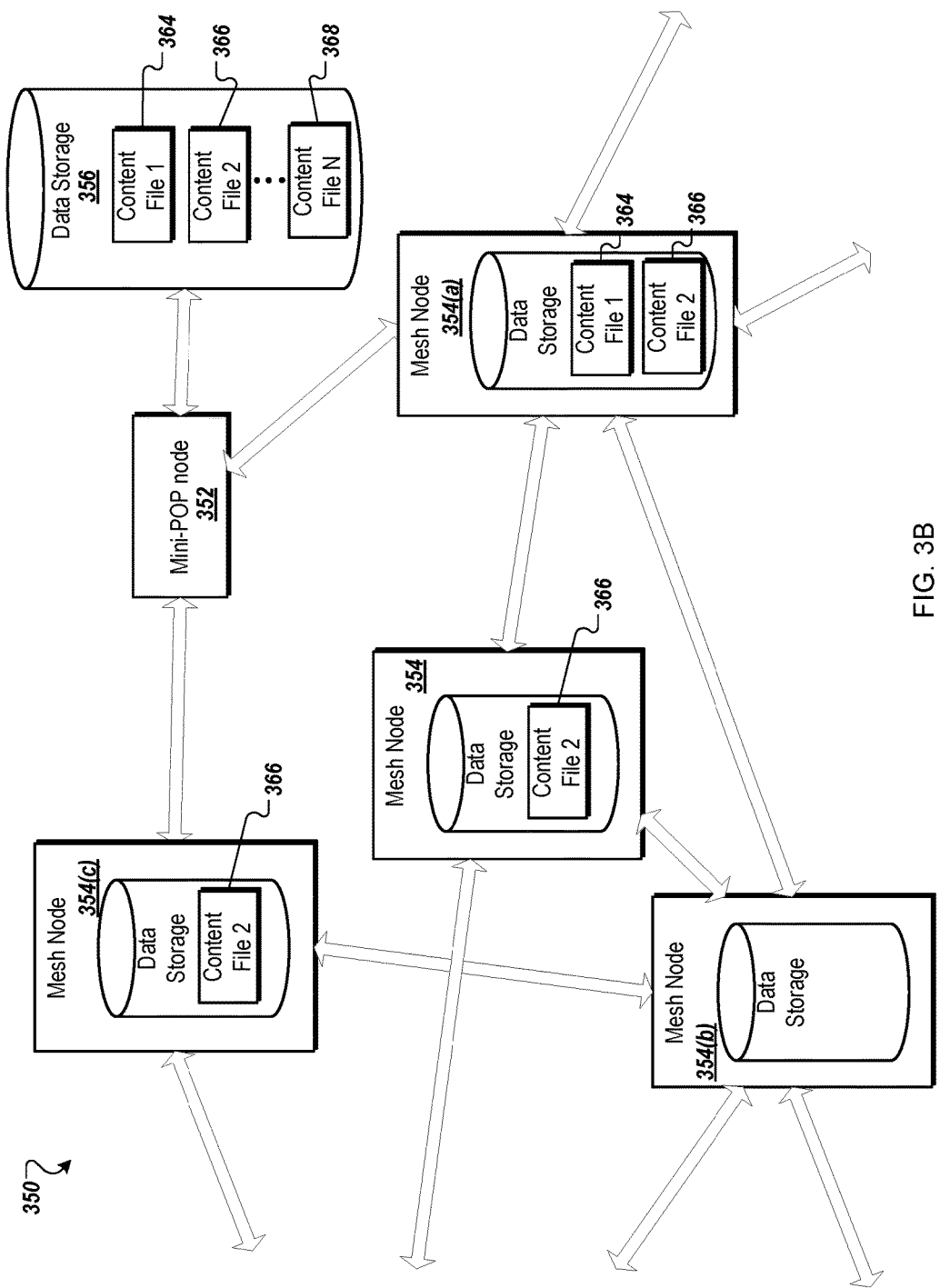
FIG. 3B is a network diagram of a WMN in which multiple content files are stored at different locations according to one embodiment.

FIG. 3B is a network diagram of a WMN 350 in which multiple content files are stored at different locations according to one embodiment. As described herein, the WMN 350 described herein can operate like a CDN in storing and caching digital content for delivery of the content to client devices. As depicted, the WMN 350 includes a mini-POP device 352 and multiple mesh network devices 354. The mini-POP device 352 is coupled to one or more data storage devices 356. The storage device(s) 356 store copies of multiple content files, including a first content file 364, a second content file 366, and an Nth content file 368, where N is some positive integer value. These content files 364, 366, 368 can be considered the original content files in the WMN 350. These content files 364, 366, 368 can be different types of content as well, such as video, audio, literature, or the like. For example, the first content file 364 may be a movie, including video and audio content, and the second content file 366 may be an e-book. Copies of the content files can be stored at various locations in the WMN 350. For example, the mesh network device 354(a) stores a copy of the first content file 364 and a copy of the second content file 366. The mesh network device 354(a) may store other content files as well. The mesh network device 354(b) can request the second content file 366 from any one of the mesh network devices 354 storing the second content file 366, such as the mesh network device 354(c) or the mesh network device 354(b). In the event that none of the mesh network devices 354 have cached the second content file 366, the mesh network device 354(b) can request the second content file 366 from the mini-POP device 352 via one or more of the mesh network devices 354. Similarly, the mesh network device 354(c) can request the first content file 364 from the mesh network devices that have cached the first content file 364, such as the mesh network device 354(a). In some cases, the WMN 350 may include hundreds or thousands of mesh network devices 354 that can store copies of different ones of the content files 364-368. The caching of the content files within the WMN 350 can be done according to caching schemes, such as those used in CDNs.

Figure 4:
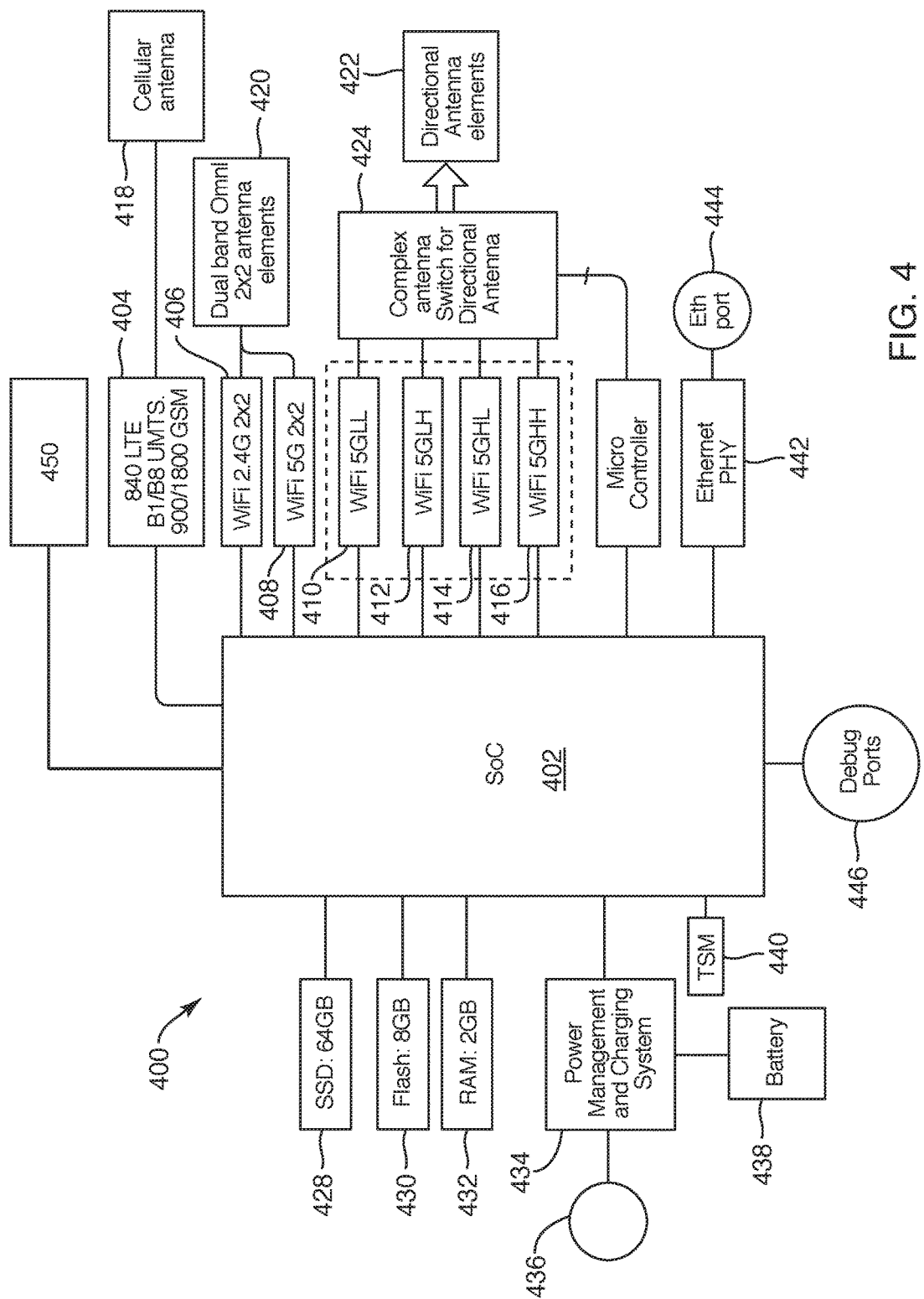
FIG. 4 is a block diagram of a mesh network device with a power line communications (PLC) radio according to one embodiment.

FIG. 4 is a block diagram of a mesh network device 400 with a power line communications (PLC) radio according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. That is, the client consumption devices do not have Internet connectivity. The mesh network device 400 may be the mini-POP device 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh network device 300 of FIG. 3A. In another embodiment, the mesh network device 400 is the mesh network device 354 of FIG. 3B.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF radio 404 (e.g., HSCI interface for cellular radio (3G)), a second interface to the WLAN 2.4 GHz radio 406, a third interface to the WLAN 2.4 GHz radio 408, and multiple interfaces to the WLAN 5 GHz radios, such as on a PCIe bus. Alternatively, the SoC 402 includes as many digital interfaces for as many radios there are in the mesh network device 400. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC. In a further embodiment, the SoC 402 includes an interface to a PLC radio 450 as described in more detail below.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., a 240V outlet, a 120V outlet, or the like). The power management and charging system 434 can also connect to a battery 438. The battery 438 can provide power in the event of power loss. The power management and charging system 434 can be configured to send a SOS message on power outage and backup system state. For example, the WLAN radios can be powered down, but the cellular radio can be powered by the battery 438 to send the SOS message. The battery 438 can provide limited operations by the mesh network device 400, such as for 10 minutes before the entire system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) radio 404 coupled between the SoC 402 and a cellular antenna 418. The first RF radio 404 supports cellular connectivity using the cellular antenna 418. In one embodiment, the first RF radio 404 is a wireless wide area network (WWAN) radio and the cellular antenna 418 is a WWAN antenna. WWAN is a form of wireless network that is larger in size than a WLAN and uses different wireless technologies. The wireless network can deliver date in the form of telephone calls, web pages, texts, messages, streaming content, or the like. The WWAN radio may use mobile telecommunication cellular network technologies, such as LTE, WiMAX (also called wireless metropolitan area network (WMAN), UTMS, CDMA2000, GSM, cellular digital packet data (CDPD), Mobitex, or the like, to transfer data.

In one embodiment, the cellular antenna 418 may include a structure that includes a primary WAN antenna and a secondary WAN antenna. The first RF radio 404 may be a wireless wide area network (WWAN) radio and the cellular antenna 418 is a WWAN antenna. The first RF radio 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF radio 404 may support other bands, as well as other cellular technologies. The mesh network device 400 may include a GPS antenna and corresponding GPS radio to track the location of the mesh network device 400, such as moves between homes. However, the mesh network device 400 is intended to be located inside a structure, the GPS antenna and radio may not be used in some embodiments.

The mesh network device 400 includes a first set of wireless local area network (WLAN) radios 406, 408 coupled between the SoC 402 and dual-band omnidirectional antennas 420. A first WLAN radio 406 may support WLAN connectivity in a first frequency range using one of the dual-band omnidirectional antennas 420. A second WLAN radio 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN radios 410-416 coupled between the SoC 402 and antenna switching circuitry 424. The second set of WLAN radios 410-416 support WLAN connectivity in the second frequency range using a set of directional antennas 422. The second set of WLAN radios 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. In one embodiment, the SoC 402 runs a mesh selection algorithm to decide which communication path to use for any particular communication and instructs, or otherwise commands, the micro controller 426 to select the appropriate communication path between a selected radio and a selected antenna. Alternatively, the micro controller 426 can receive indications from the SoC 402 of which radio is to be operating and the micro controller 426 can select an appropriate communication path between a radio (or a channel of the radio) and an appropriate antenna. The antenna switching circuitry 424 is described in more detail below with respect to FIGS. 5-7.

In another embodiment, a filter switch bank is coupled between the antenna switching circuitry 424 and the second set of WLAN radios 410-416. In another embodiment, the filter switch bank can be implemented within the antenna switching circuitry 424.

In the depicted embodiment, the first set of WLAN radios include a 2×2 2.4 GHz MIMO radio 406 and a first 2×2 5 GHz MIMO radio 408. The second set of WLAN radios includes a second 2×2 5 GHz MIMO radio 410 ("5GLL"), a third 2×2 5 GHz MIMO radio 412 ("5GLH"), a fourth 2×2 5 GHz MIMO radio 414 ("5GHL"), and a fifth 2×2 5 GHz MIMO radio 416 ("5GHH"). The dual-band omnidirectional antennas 420 may include a first omnidirectional antenna and a second omnidirectional antenna (not individually illustrated in FIG. 4). The set of directional antennas 422 includes: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth vertical orientation antenna (upper antenna described herein); a ninth horizontal antenna (upper antenna); an tenth horizontal antenna (bottom antenna); and a tenth vertical antenna (bottom antenna). These last four antennas may also be RHC orientation and LHC orientation antennas as described herein.

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

In one embodiment, the antenna switching circuitry 424 includes multiple diplexers and switches to connect different combinations of antennas to the multiple radios. FIGS. 5-7 illustrate three different architectures for the antenna switching circuitry 424. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

As illustrated, the SoC 402 can be coupled to a PLC radio 450. The PLC radio 450 is similar to the PLC radio 314 described above with respect to FIG. 3A. The PLC radio 450 is also coupled to the power supply 436 (connection not illustrated in FIG. 4). The PLC radio 450 can establish, maintain, and utilize a PLC link between the mesh network device 400 and a second mesh network device (not illustrated in FIG. 4). The PLC link can be a primary communication path, a redundant communication path, or a secondary communication path as described herein.

FIGS. 5-7 are generally directed to PLC links and wireless links for routing data on a network backbone of the WMN of mesh network devices.

FIG. 5 is a diagram of a WMN 500 with twelve network hardware devices 501-512, each having four radios to form a network backbone of peer-to-peer (P2P) wireless connections and PLC connections according to one embodiment. The WMN 500 includes multiple network hardware devices 501-512, referred to as nodes 501-512 for ease of description. In other embodiments, the WMN 500 may include more or less devices than twelve. The nodes 501-512 may be considered mesh routers that include four radios (e.g., four 5 GHz radios) and a PLC radio for the network backbone for multiple connections with other mesh routers. For example, an eleventh node 511 may be located to the north of the first node 501 and connected over a first wireless connection 541 (e.g., 5 GHz connection). The sixth node 506 may be located to the east of the first node 501 and connected over a second wireless connection 542. The second node 502 may be located to the south of the first node 501 and connected over a third wireless connection 543. The fourth node 504 may be located to the west of the first node 501 and connected over a fourth wireless connection 544. In other embodiments, additional network hardware devices can be connected to other wireless connections of the first node 501. Similarly, the second node 502 can be connected to a third node 503 over a wireless connection 547, a fifth node 505 over a wireless connection 545, and an eighth node 508 over a wireless connection 546. It should also be noted that the nodes 503-512 may also connect to other nodes using its respective radios. It should also be noted that the locations of the nodes 501-512 can be in other locations that north, south, east, and west. For example, the nodes can be located above or below the first node 501, such as on another floor of a building or house. The PLC radio of each of the nodes 501-512 can permit any one of the node 501-512 to communicate data to any other one of the nodes 501-512. For example, a first node 501 includes a first PLC radio 561 that can communicate with a second PLC radio 562 of a second node 502 over a PLC link. The PLC link can be made over power lines. In particular, the first PLC radio 561 connects to a power distribution network 550 via a first power line 552 and the second PLC radio 562 connects to the power distribution network 550 via a second power line 554. Also, the other nodes 503-512 can include a PLC radio that can communicate over respective power lines coupled to the power distribution network 550. In one embodiment, the first node 501 resides in a first building and the second node 502 resides in a second building. The first node 501 may be coupled to internal wiring of the first building via the first power line 552 and the second node 502 may be coupled to internal wiring of the second building via the second power line 554. Alternatively, the first node 501 and the second node 502 may reside in the same building and are coupled to the internal wiring of the same building.

The first node 501 includes a first radio 521, a second radio 522, a third radio 523, a fourth radio 524, and the first PLC radio 561. The first node 501 may also include at least one radio to establish a wireless connection (e.g., 2.4 GHz) with one or more client consumption devices. The first node 501 may operate as a mesh router that has four radios operating concurrently or simultaneously to transfer mesh network traffic, as well as a radio to service connected client consumption devices. This may require that the 5GLL and 5GLH to be operating simultaneously and the 5GHL and 5GHH to be operating simultaneously, as described in more detail below. The second node 502 includes a first radio 531, a second radio 532, a third radio 533, a fourth radio 534, and the second PLC radio 562. The second node 502 may also include at least one radio to establish a wireless connection (e.g., 2.4 GHz) with one or more client consumption devices. The second node 502 may operate as a mesh router that has four radios operating concurrently or simultaneously to transfer mesh network traffic, as well as a radio to service connected client consumption devices.

For routing data traffic between nodes 501-512, a software interface layer at each node can interacts with the underlying physical (PHY) layer of the radios. For each node, there are four radios to serve the mesh backbone. Each physical radio is assigned its own media access control (MAC) and the mesh network device is assigned a node MAC address. A MAC address, also called physical address, is a unique identifier assigned to network interfaces for communications on the physical network segment. MAC addresses are used as a network address for most IEEE 802 network technologies. A node MAC address is assigned to each node and each node represents a virtual interface that can be assigned the node MAC address. Routing decisions can be made with this node MAC address. Each PLC radio can be assigned a PLC address and the software interface layer can pair the PLC address with the node MAC address so that data can be transmitted between mesh network devices using the PLC link. The node's multiple radios can also be assigned MAC address according to an MAC address assignment scheme. In one embodiment, a first portion of the MAC address (e.g., the most significant 45 bits of a 48-bit MAC address) can be fixed and an assignment of a second portion of the MAC address can be assigned to the virtual interface for the node and the individual radios. In this embodiment, there are 7 MAC addresses. The following table illustrates an exemplary address assignment scheme for this embodiment.

| Last 3 Bits of MAC address | MAC Address assignment |
|---|---|
| 0 | Node (Virtual Interface) |
| 1 | Radio 1 (directional) |
| 2 | Radio 2 (directional) |
| 3 | Radio 3 (directional) |
| 4 | Radio 4 (directional) |
| 5 | Omni 2.4 GHz Radio |
| 6 | Omni 5 GHz Radio |
| 7 | Reserved |

In this embodiment, it is assumed that each mesh network device has 4 radios and each radio may communicate with at most one neighbor node. The PLC address of the corresponding PLC radio can be paired with the corresponding node MAC address of the respective mesh network device. As noted herein, a radio can communicate with more than one neighbor node if they use the same channel and sector. A neighbor node is a node to which a node has established a wireless connection, such as a P2P wireless connection, without any intervening nodes between the node and the neighbor node. In this embodiment, the first node 501 includes four neighbor nodes, including the eleventh node 511 over the wireless connection 541, the sixth node 506 over the wireless connection 542, the second node 502 over the wireless connection 543, and the fourth node 504 over the wireless connection 544. In one embodiment, the WMN 500 implements the IEEE 802.11s mesh implementation for defining how wireless devices can interconnect to create a WLAN mesh network. The 802.11 is a set of IEEE standards that govern wireless networking transmission methods. They are commonly used today in their 802.11a, 802.11b, 802.11g, and 802.11n versions to provide wireless connectivity in the home, office and some commercial establishments. The 802.11s is an IEEE 802.11 amendment for mesh networking. The first node 501 can also establish a PLC link between the first PLC radio 561 of the first node 501 and a PLC radio of any other node having a PLC radio, such as the second PLC radio 562 of the second node 502.

In one embodiment, the software interface layer sits on top of the four radios 521-524 and the PLC radio 561 and acts as a virtual interface for the first node 501. The software interface layer owns the node MAC address. The software interface layer may keep a list of the four radio network devices (abbreviated "radio netdevs"). The software interface layer may also be considered a netdev for an operating system's data stack for routing data traffic to and from the radio netdevs. For example, the software interface layer creates and maintains a master routing table. In particular, the software interface layer may consolidate local routing tables from all radios into the master routing table. The software interface layer may prioritize routing based on a metric reported by the individual radios in the local routing tables. During operation, the software interface layer decides to which radio of the first node 501 to forward the data packets and/or control packets. There may be different routes between a source node and a single destination node, as described herein.

In one embodiment, the software interface layer operates in a control plane and in a data plane. Operations by the software interface layer in control plane may include peering, path discovery, and messaging (such as to pause or resume radios), as described herein. In the data plane, the software interface layer decides to which radio to forward the frame based on the master routing table for transmitting data. All frames received by the individual radios go to the software interface layer for forwarding decisions.

In one embodiment, the software interface layer of the first node 501 maintains a list of the MAC pairs, including the node MAC address and the PLC address, as described herein, so the first node 501 can access any other node in the WMN 500 through one of the wireless radios 521-524 or the first PLC radio 561. In a further embodiment, the list can be used to establish proper synchronization and timing between the first PLC radio 561 and the wireless radios 521-524.

In a further embodiment, once a data session is established between the first node 501 and the second node 502, one of the wireless radios 521-524 can be used to push the main transmission data packets through a primary wireless link and the PLC radio 561 can be used to exchange command and control messages between the first node 501 and the second node 502 through a PLC link. In some cases, if any of the nodes detects a degradation of the primary wireless link, the first node 501 can handover the main transmission data packets being sent on the primary wireless link to the PLC radio 561 to assure continued continuation between the nodes. In other cases, if any node suffers degraded performance on the primary wireless link that makes the node non-responsive on the wireless network, the PLC radio 561 can broadcast a message to neighboring mesh nodes to trigger a mesh reconfiguration, such as changing hoping maps at the neighboring mesh nodes.

In another embodiment, a rule engine can operate in the MNCS service to manage the PLC network. In another embodiment, a rule engine can operate in the mini-POP to manage the PLC network. For example, should the mesh network 500 may lose connection to the MNCS service, the rule engine on one of the nodes could manage the PLC network to ensure that the nodes can communicate with one another in a control plane via the PLC network. There may be some scenarios where a mesh node is unresponsive via the wireless connections, such as on one of the radios. The PLC network can be used to potentially still communicate with the non-responsive node. The PLC network can be used to report the status of a non-responsive node. The status may be used in deciding whether to re-route any neighboring nodes for the network backbone to ensure routing of data traffic in the mesh network. It should be noted that the rule engine in the MNCS service could manage multiple mesh networks.

It should be noted that although the depicted embodiment illustrates and describes twelve mesh network devices, in other embodiments, more than twelve mesh network devices may be used in the WMN 500. It should be noted that FIG. 5 is a simplification of neighboring mesh network devices for a given mesh network device. The deployment of forty or more mesh network device may actually be located at various directions than simply north, south, east, and west as illustrated in FIG. 5. Also, it should be noted that here are a limited number of communication channels available to communicate with neighboring mesh network devices in the particular wireless technology, such as the Wi-Fi® 5 GHz band. The embodiments of the mesh network devices, such as the directional antennas, can help with isolation between neighboring antennas that cannot be separated physically given the limited size the mesh network device.

FIG. 6 is a flow diagram of a method 600 of communicating data over a wireless link and a PLC link by a mesh network device a WMN according to one embodiment. The method 600 may be at least partially performed by processing logic that may include hardware (e.g., circuitry, dedicated logic, programmable logic, microcode, etc.), software (e.g., instructions executed by a processing device), firmware, or any combination thereof. The method 600 may be performed by processing logic of mini-POP device 102 of FIG. 1. Alternatively, any of the mesh network devices of FIGS. 1, 2, 3A, 3B, 4, and 5 may perform the method 600.

Referring to FIG. 6, the method 600 begins the processing logic determining whether a PLC radio is to communicate data on a PLC link as a primary communication path between the mesh network device and a second mesh network device (block 602). When the PLC link is the primary communication path, the processing logic communicates data using the PLC radio on the PLC link (block 604). The data may include data packets of a main data transmission, control packets of a command and control message, or both. After communicating the data at block 604, the processing logic may return to block 602 to determine if the processing logic is to continue as the PLC link as the primary communication path.

If at block 602 the processing logic determines that the PLC link is not the primary communication path, the processing logic determines whether the PLC radio is to communicate data on the PLC link as a control communication path between the mesh network device and the second mesh network device (block 606). When the PLC link is the control communication path, the processing logic communicates data packets using a wireless radio on a wireless link (block 608) and communicates control packets using the PLC radio on the PLC link (block 610). After communicating the data at block 610, the processing logic may return to block 602 to determine if the processing logic is to continue as the PLC link as the primary communication path.

If at block 606 the processing logic determines that the PLC link is not the control communication path, the processing logic determines whether the PLC radio is to communicate data on the PLC link as a redundant communication path between the mesh network device and the second mesh network device (block 612). When the PLC link is the redundant communication path, the processing logic communicates data packets using the wireless radio on the wireless link (block 614) and communicates redundant data using the PLC radio on the PLC link (block 616). After communicating the data at block 616, the processing logic may return to block 602 to determine if the processing logic is to continue as the PLC link as the primary communication path.

If at block 612 the processing logic determines that the PLC link is not the redundant communication path, the processing logic determines whether the PLC radio is to communicate data on the PLC link as a secondary communication path between the mesh network device and the second mesh network device (block 618). When the PLC link is the secondary communication path, the processing logic communicates some data using the wireless radio on the wireless link (block 620) and communicates some data using the PLC radio on the PLC link (block 622). After communicating the data at block 622, the processing logic may return to block 602 to determine if the processing logic is to continue as the PLC link as the primary communication path.

Security in wireless communication is a concern for all wireless links. For wired links, a hacker has to gain access to the wired link, such as by drilling through a wall. Also, wired links like Ethernet can communicate without sharing any security codes between a transmitter and a receiver. Wireless links, however, do not have physical protection from gaining access to the wireless link because the data is transmitted over the air. In wireless, a hacker can gain access to the wireless link with a radio. The hacker's radio receives the data being transmitted by a transmitting radio and the hacker tries to decode and/or decrypt the data being transmitted. Encryption can be used to encode messages being communicated. Encryption is a process of encoding messages or information in such a way that only authorized parties can read the messages. Encryption does not prevent interception of the data, as described above, but denies the content of the messages to be intercepted. In an encryption scheme, the content of the message, also referred to as plaintext, is encrypted using an encryption algorithm, generating ciphertext that can only be read if decrypted. The encryption scheme uses an encryption key generated by an algorithm, such as a pseudo-random encryption key. Although it is possible to decrypt the message without the encryption key, for a well-designed encryption scheme, large computational resources and skill are needed to decrypt the message. An authorized recipient can easily decrypt the message with the key provided by the originator to recipients, but not to unauthorized interceptors.

The encryption key can be generated based on a security code, such as a password, passphrase, or the like. For example, the security code may be a WEP key, a WPA key, a security key, a password, or the like. For example, some consumer network devices have a default password that is needed to communicate on a corresponding wireless network. Also, to encrypt a communication session between two devices, the two devices can negotiate a security code (or a code word) that can be used to encrypt messages of a data session. The negotiated security code can be different for different wireless links and can be a randomly generated sequence of numbers (or characters), such as a 16-bit string. After sending the messages in the data session, the negotiated security code can be disregarded. Thus, to encrypt data being transmitted wirelessly, two radios (e.g., a transmitter radio and a receiver radio) need to perform a handshake to exchange a security code in order to encrypt the data (usually in the form of messages) being transmitted so that the hacker cannot decrypt the data. In some wireless communication protocols, before a device communicates with another device wirelessly, the devices share a security code. The security code is typically sent decoded via a text file. So, if a hacker can access a wireless link during initialization of the wireless link, the hacker can also receive the security code being sent at initialization. Even if the communication protocol uses a frequency hopping scheme, a hacker in possession of the security code can decode messages used between the devices to negotiate the frequency hopping scheme. The most vulnerable time for security in wireless communications is at initialization of a wireless link or anytime there is a security negotiation between two radios.

Described herein are embodiments to exchange sensitive data, such as a security code, between two mesh network devices. The security code can be used to encrypt data being exchanged between the two mesh network devices. In particular, the sensitive data pertaining to communication on a wireless link between a first mesh network device and a second mesh network device can be exchanged on a PLC link between the first mesh network device and the second mesh network device as described herein. Once the sensitive data is exchanged on the PLC link, the sensitive data can be used to encrypt data being sent on the wireless link. The embodiments described herein may include three layers of security. On layer is the fact that a hacker would have to gain physical access to the power supply line on which the security code is being transmitted. Another layer is that the security code can be encrypted before transmitted on the PLC link, such as using a PLC security code that was previously exchanged between PLC radios. So, even if the hacker had physical access to the PLC link, the hacker would need to have access at the time that the PLC security code is exchanged. Also, the PLC network can determine that the PLC security code needs to be updated and update the PLC security code in other manners, such as receive the PLC security code through a WWAN connection with the MNCS. Another layer of security is that the PLC radios can negotiate a time slot in which the PLC security code is exchanged, as well as a time slot in which the security code (possibly encrypted by the PLC security code) is exchanged. For example, a group owner can determine timing information, such as a time slot designation or a point of time, and send the timing information to other PLC radios in the group. The other PLC radios can use this timing information to know when the security code, the PLC security code, or both, will be sent by the group owner. Thus, a hacker would have to gain physical access to the PLC link and know the timing information for the PLC security code in order to capture the security code being exchanged for a data session.

Referring back to FIG. 5, the processing device of the first node 501, which is coupled to the power supply line 552, communicates, using the first PLC radio 561, first data including a security code with a second mesh network device (second node 502) over a first PLC link between the first PLC radio 561 and the second PLC radio 562 of the second node 502 over the power distribution network 550 via power supply lines 552, 554. The processing device of the first node 501 encrypts second data using the security code to obtain encrypted data and communicates, using the third radio 523, the encrypted data with the second mesh node 502 over a first wireless link between the third radio 523 and the first radio 531 of the second node 502.

In a further embodiment, the processing device communicates, via the first PLC radio 561, third data including a second security code with a third mesh network device over a second PLC link between the first PLC radio 561 and a third PLC radio of the third mesh network device. The third mesh network device can be any one of the other nodes 503-510. The processing device encrypts fourth data using the second security code to obtain second encrypted data and communicates, using another one of the radios 521, 522, 524, the second encrypted data with the third mesh network device over a second wireless link between the another wireless radio and a third wireless radio of the third mesh network device.

In another embodiment, the processing device generates a PLC security code for communications over the first PLC link between the first PLC radio 561 and the second PLC radio 562. The processing device communicates, using the first PLC radio 641, the PLC security code with the second node 502 over the first PLC link (e.g., 552, 550, 554). The processing device encrypts the first data using the PLC security code to obtain an encrypted security code before the processing device communicates the first data with the second node 502 over the first PLC link. In a further embodiment, the processing device sends, using the first PLC radio 641, control information to the second mesh network device over the first PLC link. The control information includes a specified time at which the first PLC radio 561 is to transmit the PLC security code over the first PLC link to the second PLC radio 562. The second data may be digital content as described herein. The second data may be main transmission data packets. Alternatively, the second data may include other types of data than digital content.

In another embodiment, the processing device receives a request for a data session to transfer a content file from the mesh network device (first node 501) to the second mesh network device (second node 502) over the wireless link (between the third radio 523 and the first radio 531). The processing device authenticates the second mesh network device as an authorized device in the WMN 500. For example, a MNSC can authenticate both mesh network devices. This authentication can be done initially when the WMN 500 is created, as well as at each data session requested. The processing device communicates, using the first PLC radio 561, a PLC security code with the second PLC radio 562. The processing device can randomly generate a string of characters as the security code for the data session. The processing device encrypts, using the PLC security code, the string of characters to obtain an encrypted security code for the data session. The processing device communicates, using the first PLC radio 561, the encrypted security code with the second PLC radio 562 over the first PLC link (552, 550, 554).

In a further embodiment, the processing device may discard the security code after completion of the data session requested above. The processing device can receive a second request for a data session to transfer a second content file from the mesh network device (first node 501) to the second mesh network device (second node 502) over the wireless link. The processing device can randomly generate a second string of characters as a second security code for the second data session. The processing device encrypts, using the PLC security code, the second string of characters to obtain a second encrypted security code for the second data session. The processing device communicates, using the first PLC radio 561, the second encrypted security code with the second PLC radio 562 over the first PLC link. The processing device encrypts third data using the second security code to obtain second encrypted data and communicates, using the third radio 523, the second encrypted data with the second mesh network device over the wireless link to the first radio 531 of the second node 502.

In another embodiment, the processing device can determine that a new security code is needed for the wireless link between the third radio 523 and the first radio 531 and can generate a second security code for subsequent communications on the wireless link. The processing device communicates, using the first PLC radio 561, the second security code with the second mesh network device over the first PLC link. The processing device encrypts third data using the second security code to obtain second encrypted data and communicates, using the third radio 523, the second encrypted data with the second node 502 over the wireless link between the third radio 523 and the first radio 531.

In another embodiment, the processing device processes a request to update a first PLC security code used by the first PLC radio 561 for communications on the first PLC link. The request includes information that specifies a time to update the first PLC security code. The processing device generates a second PLC security code and communicates, using the first PLC radio 561, the second PLC security code with the second node 502 over the first PLC link at the time specified in the request. The processing device encrypts third data using the second PLC security code to obtain second encrypted data and communicates, using the first PLC radio 561, the second encrypted data with the second node 502 over the first PLC link. In one embodiment, the request to update the first PLC security code is received from a MNCS hosted by a cloud computing system. In another embodiment, the request to update the first PLC security code can be received from other sources, such as one of the other PLC radios in the PLC network, such as a group owner.

In another embodiment, the processing device can process a request for a data session to transfer a content file to the second node 502 over the wireless link between the third radio 523 and the first radio 531. The processing device generates a second security code for the data session. The processing device encrypts the second security code with the second PLC security code to obtain a second encrypted security code. The processing device communicates, using the first PLC radio, the second encrypted security code with the second node 502 over the first PLC link. The processing device encrypts fourth data using the second security code to obtain third encrypted data and communicates, using the first wireless radio 561, the third encrypted data with the second node over the wireless link between the third radio 523 and the first radio 531.

In a further embodiment, the first node 501 includes a WWAN radio coupled to a WWAN antenna. The processing device communicates, using the WWAN radio, a media access control (MAC) address of the third radio 523 and a MAC address of the first PLC radio 561 with MNCS hosted in a cloud computing system. The processing device may also receive, via the WWAN radio, a MAC address of the first radio 531 and a MAC address of the second PLC radio 562 from the MNCS. Alternatively, the processing device may receive these MAC addresses over the PLC link.

In another embodiment, the processing device performs a handshake authentication process in which the processing device communicates, using the first PLC radio 561, authentication messages with the second PLC radio 562. The processing device can also perform a security code exchange in which the processing device communicates, using the first PLC radio 561, the security code with the second PLC radio 562.

FIG. 7 is a flow diagram of a method 700 of communicating sensitive data over a PLC link by a mesh network device a WMN according to one embodiment. The method 700 may be at least partially performed by processing logic that may include hardware (e.g., circuitry, dedicated logic, programmable logic, microcode, etc.), software (e.g., instructions executed by a processing device), firmware, or any combination thereof. The method 700 may be performed by processing logic of mini-POP device 102 of FIG. 1. Alternatively, any of the mesh network devices of FIGS. 1, 2, 3A, 3B, 4, and 5 may perform the method 700.

Referring to FIG. 7, the method 700 begins with the processing logic receiving a request to transfer a content file in a data session over a wireless link (block 702). The processing logic authenticates the second mesh network device as an authorized mesh network device in WMN (block 704). If the second mesh network device is not authenticated at block 704, the method 600 may end and the processing logic may return a response to the requester, indicating that the second mesh network device failed to authenticate. If the second mesh network device is authenticated at block 704, the processing logic generates a security code for the data session (block 706) and communicates, using a PLC radio, the security code over a PLC link between a first PLC radio of the mesh network device and a PLC radio of the second mesh network device (block 708). In one embodiment, the processing logic encrypts the security code with a PLC security code before exchanging the security code with the second mesh network device over the PLC link at block 708. At block 710, the processing logic encrypts data content of the content file using the security code to obtain encrypted data content. The processing logic communicates, using the first PLC radio, the encrypted data content with the second mesh network device over the wireless link between a first wireless radio of the mesh network device and a second wireless radio of the second mesh network device (block 712). The processing logic determines if the data session has completed (block 714). If the data session has not completed at block 714, the processing logic returns to block 710 and continues to encrypt data content of the content file. If the data session has been completed at block 714, the processing logic ends the method 700.

In other embodiments, the processing logic can perform other combinations of the various operations described above with respect to FIG. 3A and FIG. 5 with respect to communicating the security code over the PLC link.

FIGS. 8-9 are generally directed to multi-radio, multi-channel (MRMC) mesh network devices that may implement various embodiments described herein.

FIG. 8 illustrates a multi-radio, multi-channel (MRMC) network device 800 according to one embodiment. The MRMC network 800 includes a metal housing 802 that has eight sectors 804-818. Each of the eight sectors 804-818 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 802. The top portion and the four side portions may be metal surfaces or have portions of metal. Also, the outer top surfaces of the eight sectors form an inner chamber 811 in a center of the metal housing 802. In particular, the sector 808 may be considered a reflective chamber that includes an top portion 830, a first side portion 832, a second side portion 834, a third side portion 836, and a fourth side portion 838. The other sectors 804, 806, 810, 812, 814, 816, and 818 may have similar metal portions or surfaces as reflective chambers as the sector 808. Similarly, the inner chamber 811 can be considered reflective. For example, the circuit board 820 includes a metal ground plane that is a reflective surface for the top antenna, as well as for the bottom antenna. The opposite sides of the metal surfaces of the reflective chambers also are reflective for the top and bottom antennas.

In the depicted embodiment, the MRMC network 800 includes a circuit board 820 disposed within the metal housing 802. In particular, the circuit board 820 may include multiple portions, such as a first portion disposed in the inner chamber 811. There may be a second portion of the circuit board 820 disposed within a first sector 804 and a third portion of the circuit board 820 disposed within a second sector 806. These portions may extend to an outer side of the metal housing 802. The circuit board 820 may also include smaller portions that are disposed in the other sectors 808-818 to accommodate some of the antenna pairs disposed within the respective sectors.

In the depicted embodiment, the MRMC network 800 includes eight pairs of antennas 840, each pair being disposed in one of the eight sectors 804-818. Each pair includes a horizontal orientation antenna and a vertical orientation antenna. The eight pairs of antennas 840 may be disposed on, above, or below corresponding sections of the circuit board 820. In one embodiment, each of the eight pairs of antennas 840 is a pair of cross polarized dipole antennas, a pair of vertical polarized dipole antennas, or a pair of cross polarized patch antennas.

In some embodiments, the MRMC network 800 includes a top antenna disposed on a top side of the circuit board 820 within the inner chamber 811 and a bottom antenna disposed on a bottom side of the circuit board 820 within the inner chamber 811. In the depicted embodiment, top antennas 842, 844 are disposed above the circuit board 820, and bottom antennas 846, 848 are disposed below the circuit board 820. The top antennas 842, 844 and the bottom antennas 846, 848 are helix coil antennas. In other embodiments, the top and bottom antennas may be other types of antennas, such as patch antennas, monopoles, dipoles, loops, folded monopoles, or the like.

In the depicted embodiment, the eight pairs of antennas 840, the top antennas 842, 844, and the bottom antennas 846, 848 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 830 and the four side portions 832-838 of the sector 808 operate as a reflector chamber for the pair of antennas 840 within the respective chamber. The reflective chamber reflects the electromagnetic energy, radiated by the horizontal orientation antenna, in a first directional radiation pattern with high gain in a direction along a center axis of the sector 808 (e.g., a truncated pyramid structure) and reflects the electromagnetic energy, radiated by the vertical orientation antenna, in a second directional radiation pattern with high gain in the direction along the center axis of the sector 808. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network 800 includes a first omnidirectional antenna 850 (e.g., dual-band WLAN antenna) disposed on the top side of the second portion of the circuit board 820 disposed within the sector 804 (i.e., a first of the eight sectors). In a further embodiment, a second omnidirectional antenna 852 is disposed on the top side of the third portion of the circuit board 820 disposed within the sector 806 (i.e., a second of the eight sectors). The first omnidirectional antenna 850 and the second omnidirectional antenna 852 are designed to radiate electromagnetic energy in the first frequency range (e.g., 5 GHz band) and a second frequency range (e.g., 2.4 GHz band).

In the depicted embodiment, the MRMC network 800 includes a first cellular antenna 854 (e.g., WWAN antenna) disposed on the top side of the second portion of the circuit board 820 disposed within the sector 804 (i.e., a first of the eight sectors). In a further embodiment, a second cellular antenna 856 is disposed on the top side of the third portion of the circuit board 820 disposed within the sector 806 (i.e., a second of the eight sectors). The first cellular antenna 854 and the second cellular antenna 856 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network 800 includes a first RF radio (not illustrated in FIG. 8) disposed on the circuit board 820 and coupled to the first cellular antenna 854 and the second cellular antenna 856. The first RF radio causes the first cellular antenna 854, the second cellular antenna 856, or both to radiate the electromagnetic energy in the third frequency range. In a further embodiment, multiple RF radios (not illustrated in FIG. 8) are disposed on the circuit board 820 and coupled to the eight pairs of antennas 840, the top antennas 842, 844, and the bottom antennas 846, 848. The RF radios cause different combinations of one or more of the eight pairs of antennas 840, the top antennas 842, 844, and the bottom antennas 846, 848 to radiate the electromagnetic energy in the first frequency range (e.g., 2.4 GHz band). In a further embodiment, a second RF radio (not illustrated in FIG. 8) is disposed on the circuit board 820 and coupled to the first omnidirectional antenna 850 and the second omnidirectional antenna 852. The second RF radio cause the first omnidirectional antenna 850, the second omnidirectional antenna 852, or both to radiate the electromagnetic energy in the first frequency range (e.g., 5 GHz band).

In the depicted embodiment, the MRMC network 800 includes a third RF radio (not illustrated in FIG. 8) disposed on the circuit board 820 and coupled to the first omnidirectional antenna 850 and the second omnidirectional antenna 852. The second RF radio cause the first omnidirectional antenna 850, the second omnidirectional antenna 852, or both to radiate the electromagnetic energy in the second frequency range (e.g., 2.4 GHz band).

FIG. 9 is a block diagram of a network hardware device 900 according to one embodiment. The network hardware device 900 may correspond to the network hardware device 102-110 of FIG. 1. In another embodiment, the network hardware device 900 may correspond to the network hardware devices 202-210 in FIG. 2. In another embodiment, the network hardware device 900 may correspond to the mesh network device 300 of FIG. 3A. Alternatively, the network hardware device 900 may be other electronic devices, as described herein.

The network hardware device 900 includes one or more processor(s) 930, such as one or more CPUs, microcontrollers, field programmable gate arrays, or other types of processors. The network hardware device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the network hardware device 900. The network hardware device 900 performs functions by using the processor(s) 930 to execute instructions provided by the system memory 906.

The network hardware device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the network hardware device 900, the system memory 906 and the processor(s) 930 also constituting computer-readable media. The network hardware device 900 may also include one or more input devices 918 (keyboard, mouse device, specialized selection keys, etc.) and one or more output devices 920 (displays, printers, audio output mechanisms, etc.).

The network hardware device 900 further includes a modem 922 to allow the network hardware device 900 to communicate via a wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, PAN module, GPS module, a PLC module that includes a PLC radio 987 as described herein, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the network hardware device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the network hardware device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh network devices of the WMN and the second wireless connection may be associated with serving a content file to a client consumption device, as described herein.

Though a modem 922 is shown to control transmission and reception via antenna (984, 985, 987), the network hardware device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless mesh network (WMN) for distributing content files to client consumption devices in an environment of limited connectivity to broadband Internet infrastructure, the WMN comprising:
   a miniature point-of-presence (mini-POP) device having a first wired connection to an attached storage device and a point-to-point wireless connection to a server of a content delivery network (CDN);
   a first mesh network device comprising:
      a first application processor;
      a first alternating current (AC) power line coupled to a power distribution network, wherein the first AC power line supplies power to the first mesh network device;
      a first wireless local area network (WLAN) radio coupled to the first application processor, the first WLAN radio to wirelessly communicate with the mini-POP device;
      a second WLAN radio coupled to the first application processor; and
      a first power line communications (PLC) radio coupled to the first AC power line and the first application processor;
   a second mesh network device comprising:
      a second application processor;
      a second AC power line coupled to the power distribution network, wherein the second AC power line supplies power to the second mesh network device;
      a third WLAN radio coupled to the second application processor; and
      a second PLC radio coupled to the second application processor, wherein the first application processor is operable to:
         store a master routing table comprising:
            a first node media access control (MAC) address assigned to the first mesh network device;
            a first MAC address assigned to the first WLAN radio;
            a second MAC address assigned to the second WLAN radio;
            a third MAC address assigned to the third WLAN radio;
            a first PLC address assigned to the first PLC radio;
            a first MAC pair having the first node MAC address and the first PLC address; and
            a second MAC pair having a second node MAC address assigned to the second mesh network device and a second PLC address assigned to the second PLC radio;

determine that a first portion of digital content is to be transmitted over a wireless link between the first WLAN radio and the third WLAN radio of the second mesh network device and a second portion of the digital content is to be transmitted over a PLC link between the first PLC radio and the second PLC radio of the second mesh network device via the power distribution network;

transmit first data packets to the second mesh network device over the wireless link using the first MAC address and the third MAC address; and transmit second data packets to the second mesh network device over the PLC link using the first MAC pair and the second MAC pair.

2. The WMN of claim 1, wherein the second data packets further comprises command and control data of one or more command and control messages.

3. The WMN of claim 1, wherein the first application processor is further operable to transmit third data packets to a third mesh network device over a second wireless link between the second WLAN radio and a fourth WLAN radio of the third mesh network device.

4. A mesh network device comprising:
a power supply line coupled to a power distribution network;
a processing device coupled to the power supply line;
a first wireless radio coupled to the processing device; and
a first power line communication (PLC) radio coupled to the processing device and the power supply line, wherein the processing device is to:
store a list comprising: a first node media access control (MAC) address assigned to the mesh network device, a second node MAC address assigned to a second mesh network device, a first MAC address assigned to the first wireless radio, a first PLC address assigned to the first PLC radio and paired with the first node MAC address, and a second PLC address assigned to a second PLC radio of the second mesh network device and paired with the second node MAC address;
communicate, using the first wireless radio and the second node MAC address, first data with the second mesh network device over a wireless link;
communicate, via the power distribution network using the PLC radio and the second PLC address, second data with the second mesh network device over a PLC link between the mesh network device and the second mesh network device;
determine that a current link quality metric of the wireless link is less than a specified amount; and
communicate, using the PLC radio and the second PLC address, second data packets to the second mesh network device over the PLC link in response to the current link quality metric being less than the specified amount, wherein the second data packets comprises some or all of remaining first data packets of the first data.

5. The mesh network device of claim 4, wherein the first data packets include digital content, and wherein the second data packets include at least some of the same digital content.

6. The mesh network device of claim 4, wherein the first data packets include digital content, and wherein the second data packets further comprises control packets.

7. The mesh network device of claim 6, wherein the control packets comprise at least one of:
routing information;
link quality information;
channel quality information;
available channel information;
background scan information; or
wireless mesh network information.

8. The mesh network device of claim 4, wherein the first data packets include digital content, and wherein the second data packets include digital content.

9. The mesh network device of claim 4, wherein the first data packets include digital content, and wherein the processing device is operable to:
determine that the wireless link is not responsive; and
communicate, using the PLC radio, second data packets of the digital content to the second mesh network device over the PLC link, wherein the second data packets comprise some or all of remaining first data packets of the first data.

10. The mesh network device of claim 4, wherein the first data packets include digital content, and wherein, to communicate the second data packets to the second mesh network device, the processing device is operable to:
communicate, using the first wireless radio, a first subset of second data packets of the digital content to the second mesh network device over the wireless link, wherein the first subset of the second data packets comprises some of the remaining first data packets of the first data; and
communicate, using the PLC radio, a second subset of the second data packets of the digital content to the second mesh network device over the PLC link, wherein the second subset of the second data packets comprises some of the remaining first data packets of the first data.

11. The mesh network device of claim 4, wherein the first data packets include digital content, and wherein the processing device is further operable to:
determine an amount of remaining data of the digital content to be transferred;
determine a current data rate of the wireless link;
determine a current data rate of the PLC link;
communicate, using the first wireless radio, a first subset of the data packets of the digital content to the second mesh network device over the wireless link, wherein the first subset of the data packets comprises some of the remaining first data packets of the first data; and
communicate, using the PLC radio, a second subset of the data packets of the digital content to the second mesh network device over the PLC link, wherein the second subset of the data packets comprises some of the remaining first data packets of the first data.

12. The mesh network device of claim 4, wherein the first data packets include digital content, and wherein the processing device is further operable to:
determine a presence of interference on the wireless link; and
communicate, using the PLC radio, the second data packets of the digital content to the second mesh network device over the PLC link, wherein the second data packets comprises some or all of remaining first data packets of the first data.

13. The mesh network device of claim 4, wherein the first data packets include digital content, and wherein the processing device is further operable to:
determine a presence of interference on the wireless link;
communicate, using the first wireless radio, a first subset of second data packets of the digital content to the second mesh network device over the wireless link, wherein the first subset of the second data packets comprises some of the remaining first data packets of the first data; and communicate, using the PLC radio, a second subset of the second data packets of the digital content to the second mesh network device over the PLC link, wherein the second subset of the second data packets comprises some of the remaining first data packets of the first data.

14. The mesh network device of claim 4, further comprising a second wireless radio coupled to the processing device, wherein the processing device is further to communicate, using the second wireless radio, third data with a third mesh network device over a second wireless link.

15. A mesh network device comprising:
a power supply line coupled to a power distribution network;
a processing device coupled to the power supply line;
a first wireless radio coupled to the processing device; and
a first power line communication (PLC) radio coupled to the processing device and the power supply line, wherein the processing device is to:
store a list comprising: a first node media access control (MAC) address assigned to the mesh network device, a second node MAC address assigned to a second mesh network device, a first MAC address assigned to the first wireless radio, a first PLC address assigned to the first PLC radio and paired with the first node MAC address, and a second PLC address assigned to a second PLC radio of the second mesh network device and paired with the second node MAC address;
communicate, using the first wireless radio and the second node MAC address, first data with the second mesh network device over a wireless link;
communicate, via the power distribution network using the PLC radio and the second PLC address, second data with the second mesh network device over a PLC link between the mesh network device and the second mesh network device, wherein the first data comprises first data packets including digital content, and wherein the processing device is further operable to:
determine that a current throughput metric of the wireless link is less than a specified amount;
communicate, using the first wireless radio and the second node MAC address, a first subset of second data packets of the digital content to the second mesh network device over the wireless link in response to the current throughput metric being less than the specified amount, wherein the first subset of the second data comprises some of remaining first data packets of the first data; and
communicate, using the PLC radio and the second PLC address, a second subset of the second data packets of the digital content to the second mesh network device over the PLC link in response to the current throughput metric being less than the specified amount, wherein the second subset of the second data comprises some of the remaining first data packets of the first data.

16. The mesh network device of claim 15, further comprising a second wireless radio coupled to the processing device, wherein the processing device is further to communicate, using the second wireless radio, third data with a third mesh network device over a second wireless link.

17. A mesh network device comprising:
a power supply line;
an application processor to process data signals in connection with communicating with other mesh network devices and client consumption devices in a wireless mesh network (WMN);
a first wireless local area network (WLAN) radio coupled to the application processor and coupled to a first WLAN antenna;
a second WLAN radio coupled to the application processor and coupled to a second WLAN antenna; and
a power line communications (PLC) radio coupled to the application processor and coupled to the power supply line, wherein the application processor is operable to:
store a master routing table comprising a first node media access control (MAC) address assigned to the mesh network device, a second node MAC address assigned to a second mesh network device, a third node MAC address assigned to a third mesh network device, a first MAC address assigned to the first WLAN radio, a second MAC address assigned to the second WLAN radio, a first PLC address assigned to the PLC radio and paired with the first node MAC address, a second PLC address assigned to a second PLC radio of the second mesh network device and paired with the second node MAC address, and a third PLC address assigned to a third PLC radio of the third mesh network device and paired with the third node MAC address;
communicate first data to a second mesh network device over a first wireless connection using the first WLAN radio;
communicate second data to a third mesh network device over a second wireless connection using the second WLAN radio;
communicate third data to at least one of the second mesh network device or the third mesh network device over a wired connection using the PLC radio;
determine that a bit error rate on the first wireless connection is more than a specified amount; and
communicate some or all of remaining data packets of the first data to the second mesh network device over the wired connection using the PLC radio, wherein the third data comprises the some or all of remaining data packets of the first data.

18. The mesh network device of claim 17, wherein the third data is redundant data of the first data.

19. The mesh network device of claim 17, wherein the third data comprises a command and control message.

20. The mesh network device of claim 17, wherein the application processor is further operable to:
monitor the bit error rate on the first wireless connection by the first WLAN radio and a bit error rate on the second wireless connection of the second WLAN radio.

* * * * *

UNITED STATES PATENT AND TRADEMARK OFFICE
CERTIFICATE OF CORRECTION

PATENT NO. : 10,263,667 B2  
APPLICATION NO. : 15/228595  
DATED : April 16, 2019  
INVENTOR(S) : Omar Fawazhashim Zakaria et al.

Page 1 of 1

It is certified that error appears in the above-identified patent and that said Letters Patent is hereby corrected as shown below:

In the Specification

In Column 11, Line 60, delete "massages" and insert --messages--;

In Column 11, Line 64, delete "massages" and insert --messages--;

In Column 12, Line 15, delete "massages" and insert --messages--;

In Column 12, Line 28, delete "massages" and insert --messages--.

Signed and Sealed this  
Twenty-eighth Day of May, 2019

Andrei Iancu  
*Director of the United States Patent and Trademark Office*